US010713001B2

(12) United States Patent
Tamaoki et al.

(10) Patent No.: US 10,713,001 B2
(45) Date of Patent: Jul. 14, 2020

(54) CONTROL METHOD AND VIRTUAL REALITY EXPERIENCE PROVISION APPARATUS

(71) Applicant: BANDAI NAMCO ENTERTAINMENT INC., Tokyo (JP)

(72) Inventors: Jun Tamaoki, Tokyo (JP); Haruyoshi Yamamoto, Tokyo (JP); Tetsukazu Nakanishi, Saitama (JP)

(73) Assignee: BANDAI NAMCO ENTERTAINMENT INC., Tokyo (JP)

( * ) Notice: Subject to any disclaimer, the term of this patent is extended or adjusted under 35 U.S.C. 154(b) by 0 days.

(21) Appl. No.: 16/144,404

(22) Filed: Sep. 27, 2018

(65) Prior Publication Data
US 2019/0026071 A1 Jan. 24, 2019

Related U.S. Application Data

(63) Continuation of application No. PCT/JP2017/011786, filed on Mar. 23, 2017.

(30) Foreign Application Priority Data

Mar. 30, 2016 (JP) .................................. 2016-069267

(51) Int. Cl.
*G09G 5/00* (2006.01)
*G06F 3/16* (2006.01)
(Continued)

(52) U.S. Cl.
CPC ............ *G06F 3/165* (2013.01); *A63F 13/211* (2014.09); *A63F 13/213* (2014.09); *A63F 13/25* (2014.09);
(Continued)

(58) Field of Classification Search
CPC ...................................................... G06F 3/165
See application file for complete search history.

(56) References Cited

U.S. PATENT DOCUMENTS 10,353,532 B1 * 7/2019 Holz .................... G06T 19/006
2002/0034307 A1 3/2002 Kubota
(Continued)

FOREIGN PATENT DOCUMENTS

JP H07-116348 A 5/1995
JP H10-153946 A 6/1998
(Continued)

OTHER PUBLICATIONS

Jun. 6, 2017 International Search Report issued in International Patent Application No. PCT/JP2017/011786.

*Primary Examiner* — Nan-Ying Yang
(74) *Attorney, Agent, or Firm* — Oliff PLC

(57) ABSTRACT

In a virtual reality space, a virtual reference body controlled to follow a player's hand, a virtual body part controlled to follow the player's ear, and a virtual smartphone being a virtual object as a prop are arranged. After the proximity of the virtual reference body to the virtual smartphone, the virtual smartphone is deemed as being gripped and the virtual reference body and the virtual smartphone are integrally moved. Stereophonic sound control is performed such that the emitted sound from the virtual smartphone is a ringtone before the proximity of the virtual reference body or the virtual smartphone to the virtual body part, and after the proximity, the emitted sound is switched to communication sound so that the player listens to the stereophonic sound by a headphone.

26 Claims, 15 Drawing Sheets

(51) Int. Cl.
*A63F 13/25* (2014.01)
*A63F 13/428* (2014.01)
*A63F 13/211* (2014.01)
*A63F 13/213* (2014.01)
*A63F 13/55* (2014.01)
*A63F 13/52* (2014.01)
*A63F 13/54* (2014.01)
*G06F 3/01* (2006.01)
*G09G 3/00* (2006.01)
*A63F 13/90* (2014.01)
*G06F 3/147* (2006.01)
*H04R 5/033* (2006.01)
*H04R 5/04* (2006.01)
*H04S 7/00* (2006.01)
*H04M 1/725* (2006.01)

(52) U.S. Cl.
CPC ............ *A63F 13/428* (2014.09); *A63F 13/52* (2014.09); *A63F 13/54* (2014.09); *A63F 13/55* (2014.09); *A63F 13/90* (2014.09); *G06F 3/011* (2013.01); *G06F 3/012* (2013.01); *G06F 3/017* (2013.01); *G06F 3/147* (2013.01); *G09G 3/002* (2013.01); *H04R 5/033* (2013.01); *H04R 5/04* (2013.01); *H04S 7/304* (2013.01); *A63F 2300/8082* (2013.01); *H04M 1/72527* (2013.01); *H04S 2400/11* (2013.01)

(56) References Cited

U.S. PATENT DOCUMENTS

| | | |
|---|---|---|
| 2014/0364209 A1 | 12/2014 | Perry |
| 2015/0091790 A1 | 4/2015 | Forutanpour et al. |
| 2015/0245159 A1 | 8/2015 | Osman |
| 2016/0080537 A1* | 3/2016 | Kim ................ H03G 7/002 |
| | | 455/550.1 |
| 2016/0232404 A1* | 8/2016 | Kitazono ........... G06K 9/00355 |

FOREIGN PATENT DOCUMENTS

| | | |
|---|---|---|
| JP | 2002-051399 A | 2/2002 |
| JP | 2007-050267 A | 3/2007 |
| JP | 2010-35978 A | 2/2010 |
| WO | 2014/197230 A1 | 12/2014 |
| WO | 2015/048659 A1 | 4/2015 |

* cited by examiner

FIG. 6
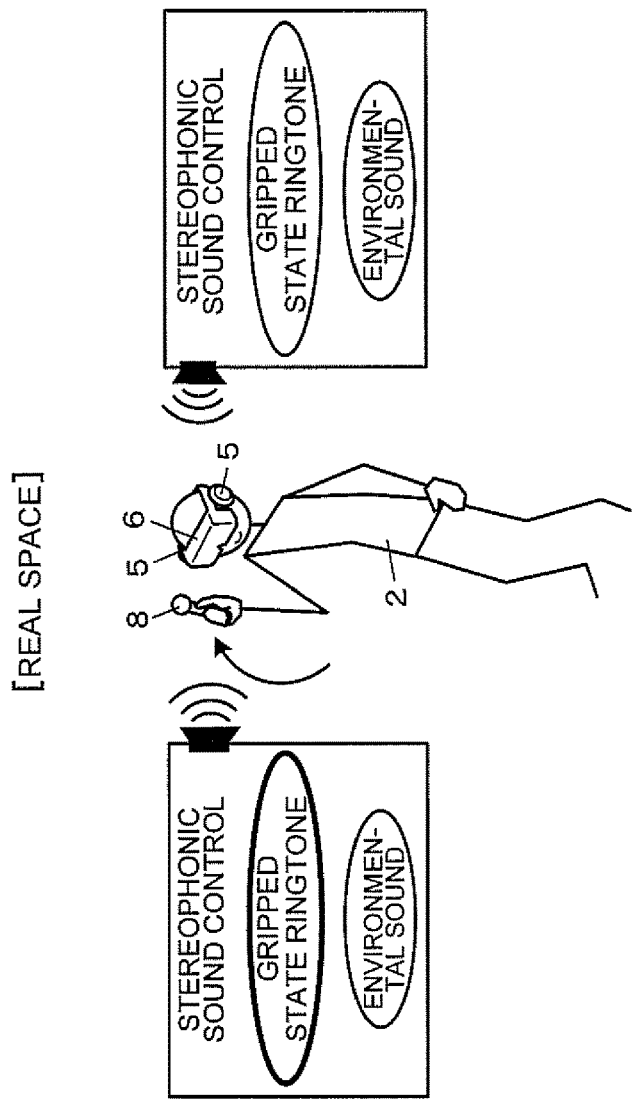
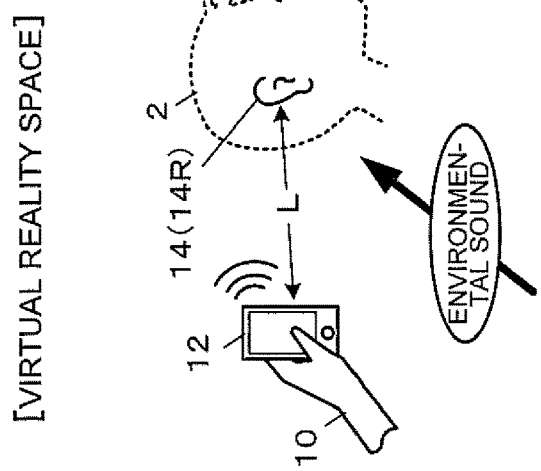

US 10,713,001 B2

CONTROL METHOD AND VIRTUAL REALITY EXPERIENCE PROVISION APPARATUS

CROSS REFERENCE TO RELATED APPLICATION

This application is a continuation of International Patent Application No. PCT/JP2017/011786, having an international filing date of Mar. 23, 2017, which designated the United States, the entirety of which is incorporated herein by reference. Japanese Patent Application No. 2016-069267 filed on Mar. 30, 2016 is also incorporated herein by reference in its entirety.

BACKGROUND

The present invention relates to a control method for displaying an image of a virtual reality space on a head tracking-type head mounted display (HMD) worn by a user and outputting sound of the virtual reality space to a headphone worn by the user.

There are publicly known virtual reality (VR) techniques for providing three-dimensional images and stereophonic sounds to the user such that the user can feel as if he/she is in a virtual reality space.

In addition, as a technique for audio expression of virtual reality, Japanese Patent Application Publication No. 2002-51399 discloses a technique for reducing a process load in the presence of a large number of mobile sound sources. Japanese Patent Application Publication No. 2007-50267 discloses a technique for detecting the position relative to a mobile sound source, and changing sequentially parameters for sound image localization to implement accurate sound image localization in synchronization with the motion of the mobile sound source.

In the consumer VR environment providable at relatively low prices at the current technical level, the player merely has a VR-type HMD with a head-tracking function on his/her head and a game controller by hand, and no reproduction of tactile sense and force sense has been yet achieved.

On the other hand, to provide virtual reality experience during gameplay, it is necessary to prepare some story for entertainment. In addition, the presence of props is meaningful to move the story smoothly. It is an important technical issue to reproduce realistic sounds of the props used by the player in a virtual reality space for improvement of a sense of immersion.

For example, imagine a scene in which the player holds and uses a virtual cell phone in a virtual reality space. The virtual cell phone is off course not existent in actuality, and thus the player acts as if he/she picks up the non-existent cell phone, puts it close to his/her ear, and starts communications virtually. Since it is not possible to reproduce a force sense of holding the virtual cell phone or a detailed tactile sense of pressing a call button or the like, the reality of VR experience greatly depends on how to reproduce real sounds related to the virtual cell phone.

The same thing can be said to other examples such as a scene in which the player holds and uses a virtual radar sensor like a metal detector and a scene in which the player holds and uses a virtual directive microphone.

SUMMARY

According to one aspect of the invention, there is provided a control method comprising:

tracking a position of a reference body in a real space, the reference body being a first body part of a user or a controller;

displaying an image of a virtual reality space associated with the real space on a head tracking-type head mounted display (HMD) worn by the user;

associating a position of a virtual object given a role in the virtual reality space with the position of the reference body to follow the position of the reference body;

performing a control to output sound according to the role from a headphone worn by the user based on whether a positional condition for changing sound determined based on the position of the reference body in the real space or the position of the virtual object in the virtual reality space is satisfied.

According to another aspect of the invention, there is provided virtual reality experience provision apparatus comprising:

a reference body tracking section that tracks a position of a reference body in a real space, the reference body being a first body part of a user or a controller;

an image display control section that controls to display an image of a virtual reality space associated with the real space on a head tracking-type head mounted display (HMD) worn by the user;

a virtual object position control section that controls to associate a position of a virtual object given a role in the virtual reality space with the position of the reference body to follow the position of the reference body; and a sound output control section that controls to output sound according to the role from a headphone worn by the user based on whether a positional condition for changing sound determined based on the position of the reference body in the real space or the position of the virtual object in the virtual reality space is satisfied.

BRIEF DESCRIPTION OF THE DRAWINGS

FIG. 6 is a diagram illustrating respective circumferences in the virtual reality space and the real space when the player is bringing the virtual smartphone toward his/her head.

DESCRIPTION OF EXEMPLARY EMBODIMENTS

Figure 1:
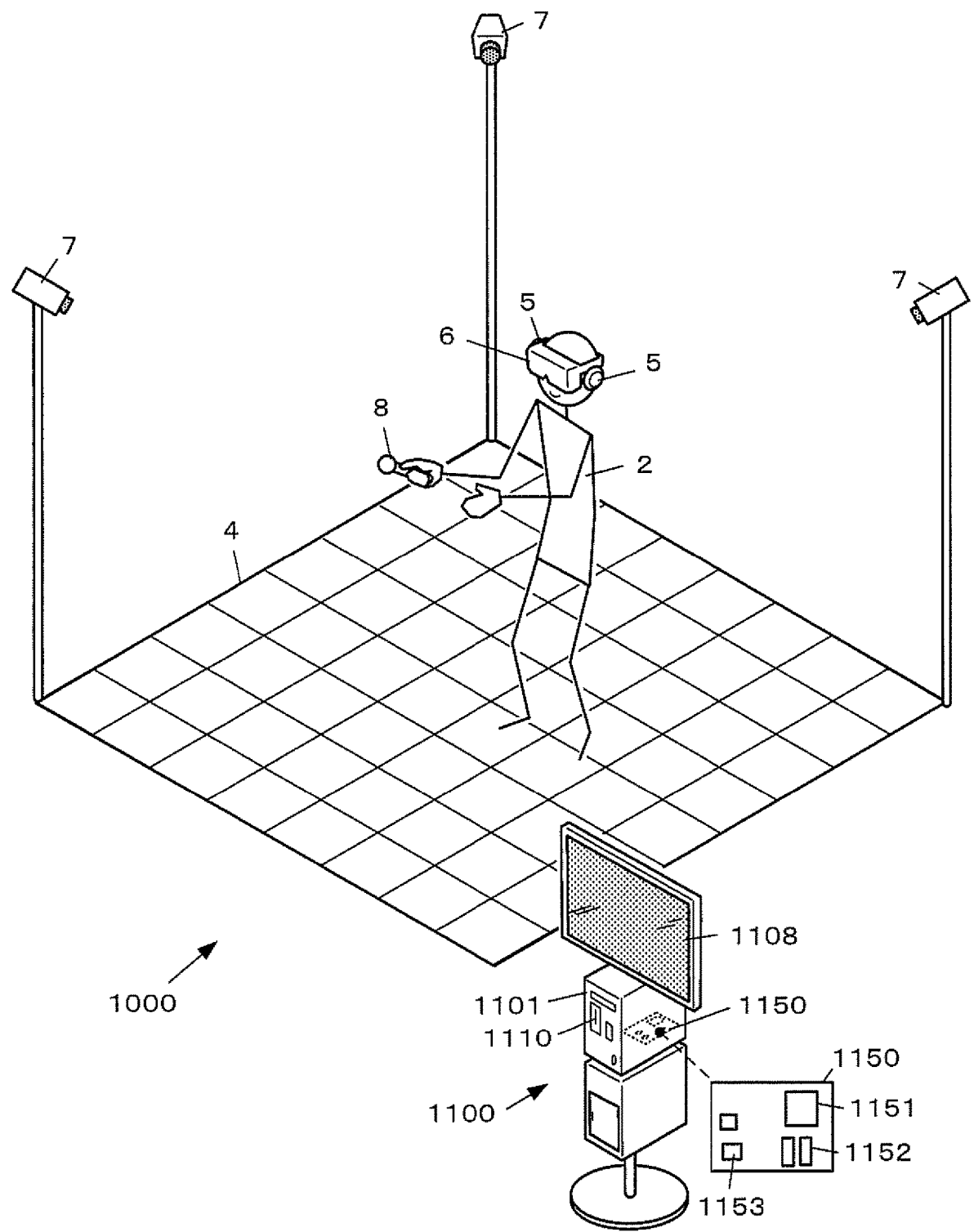
FIG. 1 is a diagram illustrating a configuration example of a game system (virtual reality experience provision apparatus).

According to an embodiment, it is possible to provide a sound control technique related to VR for further enhancing a sense of realism in a scene in which the user uses a virtual prop in a virtual reality space.

According to one embodiment of the invention, there is provided a control method comprising:

tracking a position of a reference body in a real space, the reference body being a first body part of a user or a controller;

displaying an image of a virtual reality space associated with the real space on a head tracking-type head mounted display (HMD) worn by the user;

associating a position of a virtual object given a role in the virtual reality space with the position of the reference body to follow the position of the reference body;

performing a control to output sound according to the role from a headphone worn by the user based on whether a positional condition for changing sound determined based on the position of the reference body in the real space or the position of the virtual object in the virtual reality space is satisfied.

According to another embodiment of the invention, there is provided virtual reality experience provision apparatus comprising:

a reference body tracking section that tracks a position of a reference body in a real space, the reference body being a first body part of a user or a controller;

an image display control section that controls to display an image of a virtual reality space associated with the real space on a head tracking-type head mounted display (HMD) worn by the user;

a virtual object position control section that controls to associate a position of a virtual object given a role in the virtual reality space with the position of the reference body to follow the position of the reference body; and a sound output control section that controls to output sound according to the role from a headphone worn by the user based on whether a positional condition for changing sound determined based on the position of the reference body in the real space or the position of the virtual object in the virtual reality space is satisfied.

According to this configuration, it is possible to track the position in the real space with the first body part of the user or the controller as the reference body, arrange the virtual object usable as a kind of prop given a role in the virtual reality space, and control the virtual object to follow the movement of the tracked reference body. In addition, when the position of the reference body in the real space or the position of the virtual object in the virtual reality space satisfies a certain positional condition, the sound according to the role assigned to the virtual object can be emitted from the headphone.

Accordingly, it is possible to reproduce realistic sounds in a scene in which the user holds and uses a virtual prop in the virtual reality space.

In the control method, wherein the output control of the sound may be performed such that, when the positional condition is not satisfied, the sound according to the role is not output but environmental sound in the virtual reality space is output or the environmental sound in the virtual reality space is output louder than the sound according to the role, and when the positional condition is satisfied, the environmental sound in the virtual reality space is not output but the sound according to the role is output or the sound according to the role is output louder than the environmental sound in the virtual reality space.

According to this configuration, the player hears mainly the environmental sound rather than the sound according to the role until the positional condition is satisfied, and then hears mainly the sound according to the role when the positional condition is satisfied. That is, when the positional relationship is satisfied as if the player actually uses the object in the real world, the sound can be provided such that the user feels as if the virtual object starts to play the role and perform its function. Accordingly, it is possible to further enhance the reality of the sound in a scene in which the user holds and uses a virtual prop in the virtual reality space.

The control method may further comprise changing the environmental sound based on the position of the reference body in the real space.

The control method may further comprise changing the environmental sound based on the position of the virtual object in the virtual reality space.

According to this configuration, it is also possible to change the environmental sound based on the position of the reference body in the real space or the position of the virtual object in the virtual reality space.

In the control method, wherein the output control of the sound may be performed such that it is determined whether the positional condition is satisfied, the positional condition being a distance condition that a given real target object in the real space and the reference body has become close to each other.

In the control method, wherein the output control of the sound may be performed such that it is determined whether the positional condition is satisfied, the positional condition being a distance condition that a virtual target object in the virtual reality space corresponding to the real target object and the virtual object has become close to each other.

According to this configuration, when a real object and the reference body have become close to each other in the real space, or when the virtual target object and the virtual object have become close to each other in the virtual reality space, it is possible to produce the sound according to the role of the virtual object as if the virtual object plays the role.

In the control method, wherein the virtual object may have the role of a sound emission object that emits sound in the virtual reality space, and, the output control of the sound may be performed such that it is determined whether the positional condition is satisfied with an ear of the user as the real target object so that sound is output from the headphone as if the sound emission object in the virtual reality space has become close to the ear of the user.

According to this configuration, it is possible to set up the virtual object as a prop making a sound and produce the sound as if the prop actually has become close to the user's ear.

In the control method, wherein the virtual object may have the role of a sound output device with a telephone function, and the output control of the sound may be performed such that communication sound is output as the sound according to the role by the telephone function.

According to this configuration, the virtual object is allowed to play the role of a virtual sound output device with a phone function. When the player performs an action of putting the sound output device close to his/her ear, he/she can have VR experience that the sound output device enters the phone mode to output the communication voice. Accordingly, it is possible to provide VR experience with a sense of realism, reproducing the actual use of an object existing in the real world such as a cell phone (including smartphone).

In the control method, wherein the output control of the sound may be performed such that, when the positional condition is not satisfied, the communication sound by the telephone function is not output but a ringtone by the telephone function is output, and when the positional condition is satisfied, the ringtone by the telephone function is not output but the communication sound by the telephone function is output.

According to this configuration, it is possible to perform the sound control such that the sound output device emits the ringtone until the user puts it closer to his/her ear and then switches to the dial tone when the user has put it to his/her ear. Accordingly, it is possible to provide further real VR experience.

In the control method, wherein the output control of the sound may be performed such that, when the positional condition is not satisfied, the environmental sound in the virtual reality space is output, and when the positional condition is satisfied, the environmental sound in the virtual reality space is lowered in volume and attenuated in a high-tone range.

According to this configuration, it is possible to reproduce changes in sound in a pseudo manner that would be often experienced in the real space such as the environmental sound being somewhat blocked and muffled when the sound output device is put closer to the user's ear.

In the control method, wherein the output control of the sound may be performed such that, when the positional condition is satisfied, given echoing sound is further output.

According to this configuration, it is possible to reproduce changes in sound in a pseudo manner that would be often experienced in the real space such as an echoing sound occurring when the sound output device is put closer to the user's ear.

In the control method, wherein the output control of the sound may be performed such that, when the positional condition is satisfied, given noise is further output.

According to this configuration, it is possible to reproduce changes in sound in a pseudo manner that would be often experienced in the real space such as noise being heard when the sound output device is put closer to the user's ear.

In the control method, wherein the output control of the sound may be performed such that it is determined whether each of the user's right and left ears satisfies the positional condition, and when either of the ears satisfies the positional condition, sound is output from a right or left output of the headphone corresponding to the ear satisfying the positional condition as if the sound emission object in the virtual reality space has become close to the ear.

According to this configuration, the user is allowed to experience the phenomenon that there is a difference in hearing between the right side and the left side depending on the sound emission object is put closer to the right ear or the left ear.

In the control method, wherein the output control of the sound may be performed such that it is determined whether each of the user's right and left ears satisfies the positional condition, and when either of the ears satisfies the positional condition, the sound from the right or left output of the headphone corresponding to the ear not satisfying the positional condition is reduced.

According to this configuration, decreasing the sound volume on the side where the positional condition is not satisfied (that is, the side to which the sound emission object is not put closer) to be lower than the sound volume on the side where the positional condition is satisfied (that is, the side to which the sound emission object is put closer) allows the player to listen with concentration to the sound according to the role of the virtual object.

The role of the virtual object is not limited to the sound emission object.

In the control method, wherein the virtual object may have the role of a sound input device that inputs sound in the virtual reality space, and the output control of the sound may be performed such that it is determined whether the real target object as a second body part of the user satisfies the positional condition so that emitted sound is output from the headphone as if the sound input device in the virtual reality space inputs the emitted sound from the second body part of the user.

In the control method, wherein the output control of the sound may be performed to change the sound in the case where the positional condition is satisfied depending on whether an event clear condition that a given event has occurred, has been executed, or has been attained is satisfied.

According to this configuration, it is possible to control changes in sound in relation to the occurring event.

The control method may further comprise: arranging and controlling a virtual reference body following the position of the reference body in the virtual reality space;

initially arranging the virtual object in the virtual reality space;

instructing the user to put the virtual reference body closer to the position of the initial arrangement; and after the instruction, setting an association between the virtual object and the reference body when the position of the virtual reference body and the position of the initial arrangement satisfy a predetermined condition, wherein causing the virtual object to follow the reference body may include, after setting the association between the virtual object and the reference body, associating the position of the virtual object with the position of the reference body to follow the position of the reference body.

According to this configuration, after the virtual reference body and the initially arranged virtual object have had the predetermined positional relationship, the virtual object can be moved following the movement of the virtual reference body. For example, it is possible to implement the states in which the virtual reference body holds the virtual object, and the virtual reference body has the virtual object attached, provided, or fitted thereto.

An example of an embodiment to which the present invention is applied will be described below. However, the embodiment to which the present invention is applicable is not limited to this.

FIG. 1 is a diagram illustrating a configuration example of a game system 1000 according to the present embodiment.

The game system 1000 in the present embodiment is a virtual reality experience provision apparatus that provides virtual reality experience (VR experience) to the user. The game system 1000 is a computer system designed for the user who puts a virtual reality (VR) HMD with a head tracking function on his/her head and holds a controller by hand to play a game while moving in a predetermined play field as a real space.

Specifically, the game system 1000 includes a protective sheet 4 that is spread on the floor surface of the play field, a head phone 5 and an HMD 6 put on the head of a player 2, a controller 8 handheld by the player 2, a plurality of tracking cameras 7 for tracking the positions and postures of the HMD 6 and the controller 8, and a server system 1100 connected to these components (the HMD 6, the controller 8, and the tracking camera 7) in a data-communication capable manner.

The game system 1000 in the present embodiment is supposed to be played by a single player, and thus includes one each protective sheet 4, HMD 6, controller 8, and tracking camera 7 set (three cameras in the illustrated example). However, in order to use the game system 1000 for multiple players, a plurality of suites of the HMD 6, the controller 8, the tracking camera 7 set is connected to the server system 1100.

Depending on the design of gameplay, a plurality of controllers 8 may be provided to one person. The number and positional relationship of the tracking cameras 7 as a set can be selected as appropriate according to the employed tracking technique and are not limited to the illustrated example. For example, one tracking camera 7 set may be shared among multiple players.

The protective sheet 4 is a protective material that covers a floor surface such that the player 2 with the HMD 6 does not become injured in a fall. For example, the protective sheet 4 is an elastic sheet that exhibits moderate hardness against a static load such as when a person stands but absorbs a shock properly. Instead of the protective sheet 4, the player 2 may be required to wear a helmet and protective pads for shoulders, elbows, and knees.

The headphone 5 includes right and left speaker sections to cover the right and left ears of the player 2. The number of the speakers included in one speaker section can be set as appropriate.

The HMD 6 is a VR-type head mounted display that can track the orientation and direction of the head. In the present embodiment, the HMD 6 is an immersive type (non-transparent) that covers the wearer's both eyes such that he/she cannot see the surroundings. However, the HMD 6 may be a transparent/non-transparent controllable type by transparency control. In that case, basically, non-transparent state is set during gameplay except in the event of emergency.

The HMD 6 in the present embodiment has integrally a three-axis acceleration sensor, a gyro sensor, one or more light emission sections acting as tracking markers, and the headphone 5. However, the three-axis acceleration sensor, the gyro sensor, and the light emission sections are used to implement head tracking for tracking the position and posture of the HMD 6 in the play field, and thus unnecessary elements may be omitted as appropriate depending on the tracking technique employed.

Figure 2:
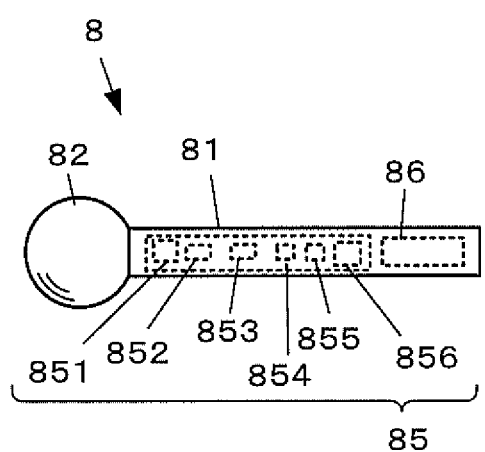
FIG. 2 is a diagram illustrating a configuration example of a controller.

FIG. 2 is a diagram illustrating a configuration example of the controller 8. The controller 8 in the present embodiment has a bar-like grip section 81 that can be held by one hand and a front-end light emitter 82 provided at the front end of the grip section 81.

The grip section 81 contains a controller control board 85 and a battery 86. The grip section 81 may have operation switches and dial switches provided as appropriate on its surface.

The controller control board 85 includes a CPU 851, an IC memory 852, an interface IC 853, a wireless communication module 854, a three-axis acceleration sensor 855, and a gyro sensor 856. Note that the controller control board 85 may also include other electronic components as appropriate.

The CPU 851 executes programs stored in the IC memory 852 to control light emission from the front-end light emitter 82 and control transmission of a switch state signal from dial switches 84 and detection signals from the three-axis acceleration sensor 855 and the gyro sensor 856 to the server system 1100 via the wireless communication module 854.

The three-axis acceleration sensor 855, the gyro sensor 856, and the front-end light emitter 82 are used to implement controller tracking for tracking the position and posture of the controller 8 in the play field, and thus unnecessary elements may be omitted as appropriate depending on the tracking technique employed.

The outer shape of the controller 8 is not limited to the foregoing one but can be set as appropriate. A game controller in a domestic stationary game device may be used as controller 8, or a dedicated controller 8 may be provided. In the case of providing the dedicated controller 8, its shape can be set as appropriate and may be a ring shape, a wristband shape, a fingerstall shape, or the like, for example.

Returning to FIG. 1, the tracking cameras 7 take pictures in the play field (on the protective sheet 4 in the present embodiment) and transmit signals and data of taken images of the HMD 6 and the controller 8 to the server system 1100. The taken images are used in head tracking to track the position and posture of the HMD 6 in the play field and controller tracking to track the position and posture of the controller 8 in the play field, as in the case of using a publicly known motion capture technique. The tracking cameras 7 may be omitted depending on the tracking technique employed. Instead of the cameras, depth sensors may be employed.

The server system 1100 is a computer system included in the game system 1000. The server system 1100 in the present embodiment has a main device 1101 and a touch panel 1108. The main device 1101 contains a gameplay charge payment section 1110 and a control board 1150.

The gameplay charge payment section 1110 accepts the payment of gameplay charge and outputs a detection signal for payment operation to the control board 1150. The gameplay charge payment section 1110 is implemented by a coin-slot device or a reader for reading a medium storing information associated with virtual currency (for example, credit card, prepaid card, e-money card, user card, and the like), which supports payment in cash, credit card, or virtual currency.

The control board 1150 contains various microprocessors such as a central processing unit (CPU) 1151, a graphics processing unit (GPU), and a digital signal processor (DSP), various IC memories 1152 such as a VRAM, a RAM, and a ROM, and a communication device 1153. The control board 1150 may be implemented partly or entirely by an application specific integrated circuit (ASIC), a field-programmable gate array (FPGA), or a system on a chip (SoC).

The server system 1100 performs arithmetic processing by the control board 1150 based on predetermined programs and data to perform: 1) user management function related to user registration; 2) head tracking and controller tracking functions; and 3) game management function to execute various controls related to the progress of the game with the HMD 6 and the controller 8 as one set of user terminals. That is, the game in the present embodiment is implemented as an on-line client-server game.

The control operations performed by the control board 1150 are not limited to the foregoing ones but may include as appropriate a control for payment of gameplay charge in credit cards or virtual currency. In the case of designing the game for multiple players, the control board 1150 may perform a function of matching with other players using other server systems 1100.

In the present embodiment, the server system 1100 is used as a single unit but may be configured such that a plurality of blade servers assigned these functions are connected together via an internal bus in a data communication-capable manner.

Alternatively, a plurality of independent servers installed in remote places may conduct data communications via a communication line (regardless of wired or wireless line) to act as the server system 1100.

[Description of the Principle]

Figure 3:
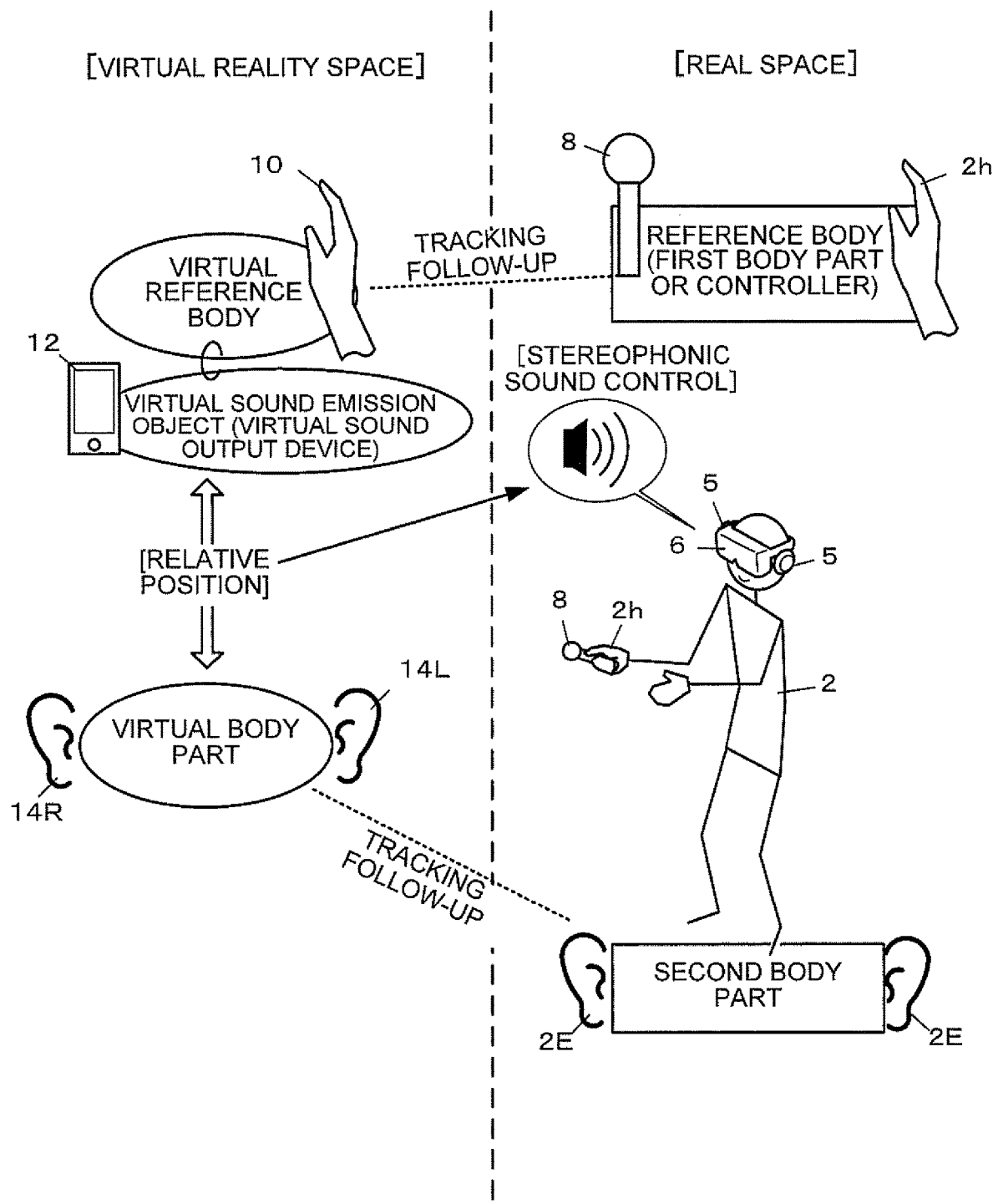
FIG. 3 is a conceptual diagram for describing the principle of sound control in a scene of a game in which the player holds and uses a prop.

FIG. 3 is a conceptual diagram for describing the principle of sound control in a scene of a game in which the player holds and uses a prop.

The game in the present embodiment is a game in which the player uses various props arranged in a virtual reality space (VR space) to fulfill missions through communications with persons in the virtual reality space.

In the following descriptions, a "virtual smartphone", a virtual sound input/output device with a phone function, is taken as an example of a prop. The following description is based on the assumption that the player, immediately after the start of the game, obtains prerequisite information for understanding the player's situation from the communication partner of the virtual smartphone and, after the end of the communication, enters into actual gameplay to attain conditions for game end.

Note that, at the actual implementation of the present embodiment, the sound-emitting prop and its role can be set as appropriate depending on the contents of the game. For example, the prop may be a music box, insect, imaginary creature, accessory, or the like.

In the present embodiment, the controller 8 or the hand holding the controller 8 (a first body part which is the right hand 2*h* of the player 2 in the illustrated example) is set as a reference body that constitutes a reference for the position and posture of the prop. The position and posture of the reference body in the real space are grasped by the tracking cameras 7 or through the tracking of the controller 8.

In the virtual reality space, a virtual reference body 10 to be associated with the reference body in the virtual reality space is prepared and controlled to track the position and posture of the reference body in the real space. The virtual reference body 10 in the present embodiment is the virtual right hand of the player 2, but may be set to the left hand without influence on the progress of the game. In addition, the virtual reference body 10 may be a leg depending on the contents of the game.

As the prop in the present embodiment, a virtual smartphone 12 is deemed as being gripped by the virtual reference body 10 when the position of the virtual smartphone 12 relative to the virtual reference body 10 satisfies a predetermined "gripped state recognition condition". From then on, the virtual smartphone 12 is associated with the virtual reference body 10 and controlled to move integrally with the virtual reference body 10 in the virtual reality space. The integral state means not only the state in which the virtual reference body 10 and the virtual smartphone 12 closely contact or bind to each other but also the state in which they are proximate to each other with a slight distance therebetween. If the prop is a fairy or the like clinging to the virtual reference body 10, the state in which the prop moves clinging to the virtual reference body 10 in a predetermined relative positional relationship with the virtual reference body 10 can be said to be an integral state.

In the present embodiment, the position and posture of right and left ears 2E as a second body part of the player 2 are tracked as a reference related to the sound control. Specifically, the positions and postures of the ears 2E are grasped at predetermined positions of the head of the player 2 determined by tracking of the HMD 6.

In addition, in the virtual reality space, a virtual body part 14 as the second body part in the virtual reality space (a virtual right ear 14R and a virtual left ear 14L in the present embodiment) are prepared and controlled to track the positions and postures of the ears 2E in the real space.

Basic sounds related to the virtual smartphone 12 are incorporated into a stereophonic sound field set in the virtual reality space. The headphone 5 emits stereophonic sounds that are controlled to enable out-of-head sound image localization for each sound source (so that the direction and distance to the sound source can be recognized in a three-dimensional manner). That is, when the player 2 turns his/her head while the virtual smartphone 12 emits sounds, the sound image localization of the virtual smartphone 12 is corrected.

Besides, in the present embodiment, various sound effects for producing a realistic use sense of the virtual smartphone 12 are selected according to the relative positional relationship between the virtual reference body 10 or the virtual smartphone 12 and the virtual body part 14 and added to stereophonic sounds.

Specific descriptions will be given as to addition of sound effects related to the virtual smartphone 12, in line with the actions of the player 2 of picking up the virtual smartphone 12 from a table top and starting communications.

Figure 4:
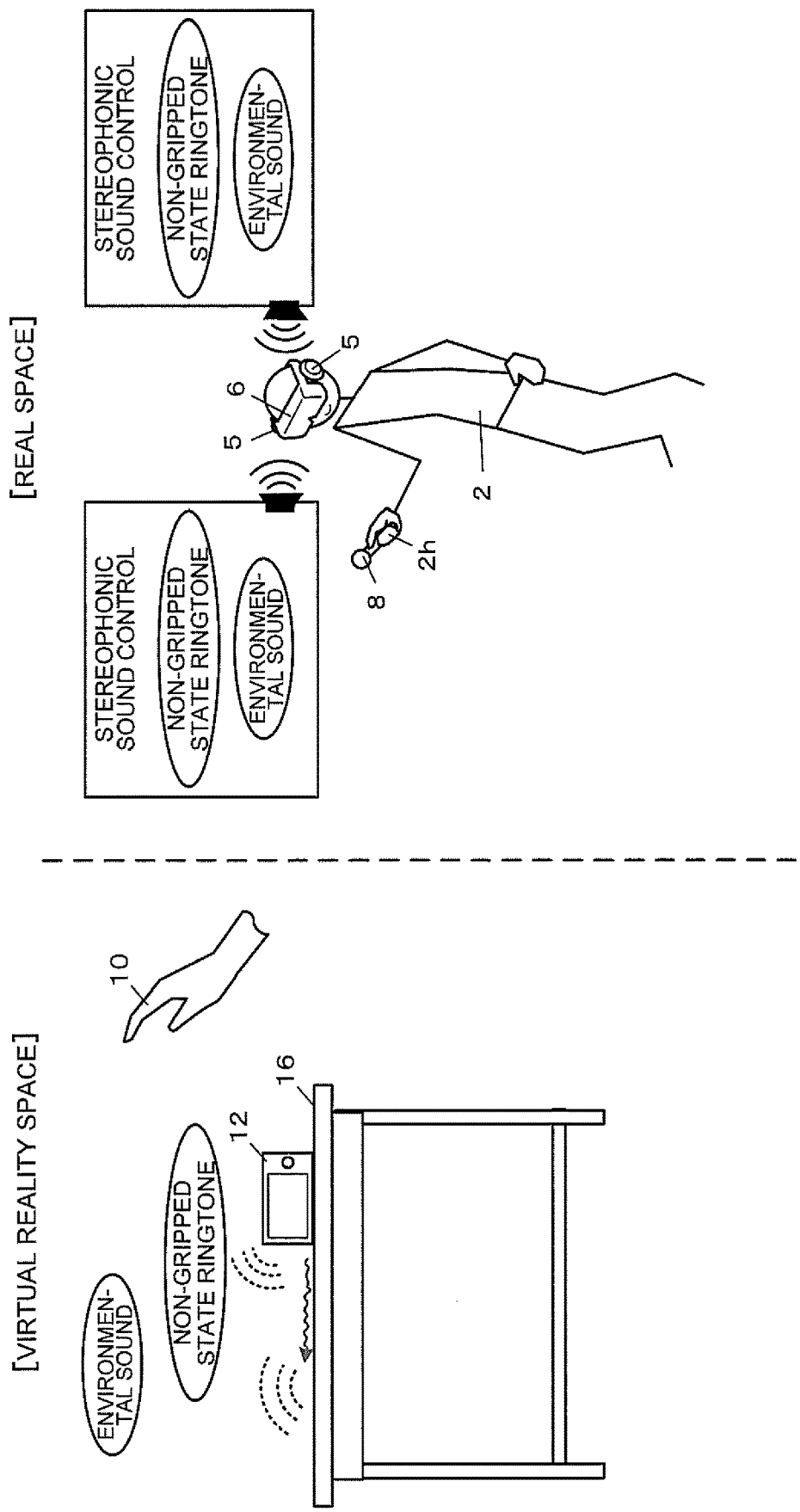
FIG. 4 is a diagram illustrating respective circumferences in a virtual reality space and a real space when a virtual smartphone is ringing on a table.

FIG. 4 is a diagram illustrating respective circumferences in the virtual reality space and the real space when the virtual smartphone 12 is ringing (emitting the ringtone) on the table.

The virtual smartphone 12 is emitting the ringtone on a virtual table 16 arranged in the virtual reality space. In this stage, the distance between the virtual reference body 10 and the virtual smartphone 12 does not satisfy the predetermined "gripped state recognition distance condition" and thus it is deemed that the virtual smartphone 12 is merely placed on the virtual table 16 and is not gripped.

The "gripped state recognition distance condition" is a first positional condition for changing the sound determined based on the position of the virtual smartphone 12 (virtual object) in the virtual reality space.

Under the sound control in this situation, a "non-gripped state ringtone" is selected from sound data related to the virtual smartphone 12 and is incorporated into a stereophonic sound field including environmental sound, setting the virtual smartphone 12 as a sound emission object in the virtual reality space, that is, a virtual sound source.

The "environmental sound" here refers to sound originating from objects other than the virtual smartphone 12 (virtual object). The environmental sound includes both sounds from unknown sound sources in the space and sounds generated by the movement of the player 2. For example, the environmental sound includes sounds generated by the walking of the player 2, and sounds of metal rubbing and clinking generated by movement of the player 2 when he/she is set to be in armor. The environmental sound may also include collision sounds of something dropping out of the hand to the floor or something in hand hitting against something else, and sounds of something denting into something else.

That is, when the player 2 turns his/her head while the virtual smartphone 12 is emitting a sound, the player 2 hears the ringtone of the virtual smartphone 12 having undergone sound image localization correction in response to the turn of the head from the headphone 5, with the environmental sound in the background. For example, the player 2 turns his/her head 90° leftward from the front of the virtual smartphone 12, the sound image localization of the virtual smartphone 12 is corrected 90° rightward.

The non-gripped state ringtone in the present embodiment is designed to include not only the ringtone directly emitted from the virtual smartphone 12 but also the sound indirectly emitted from the surface of the virtual table 16 to which the ringtone (and the vibration from the vibrator) have been transferred.

Figure 5:
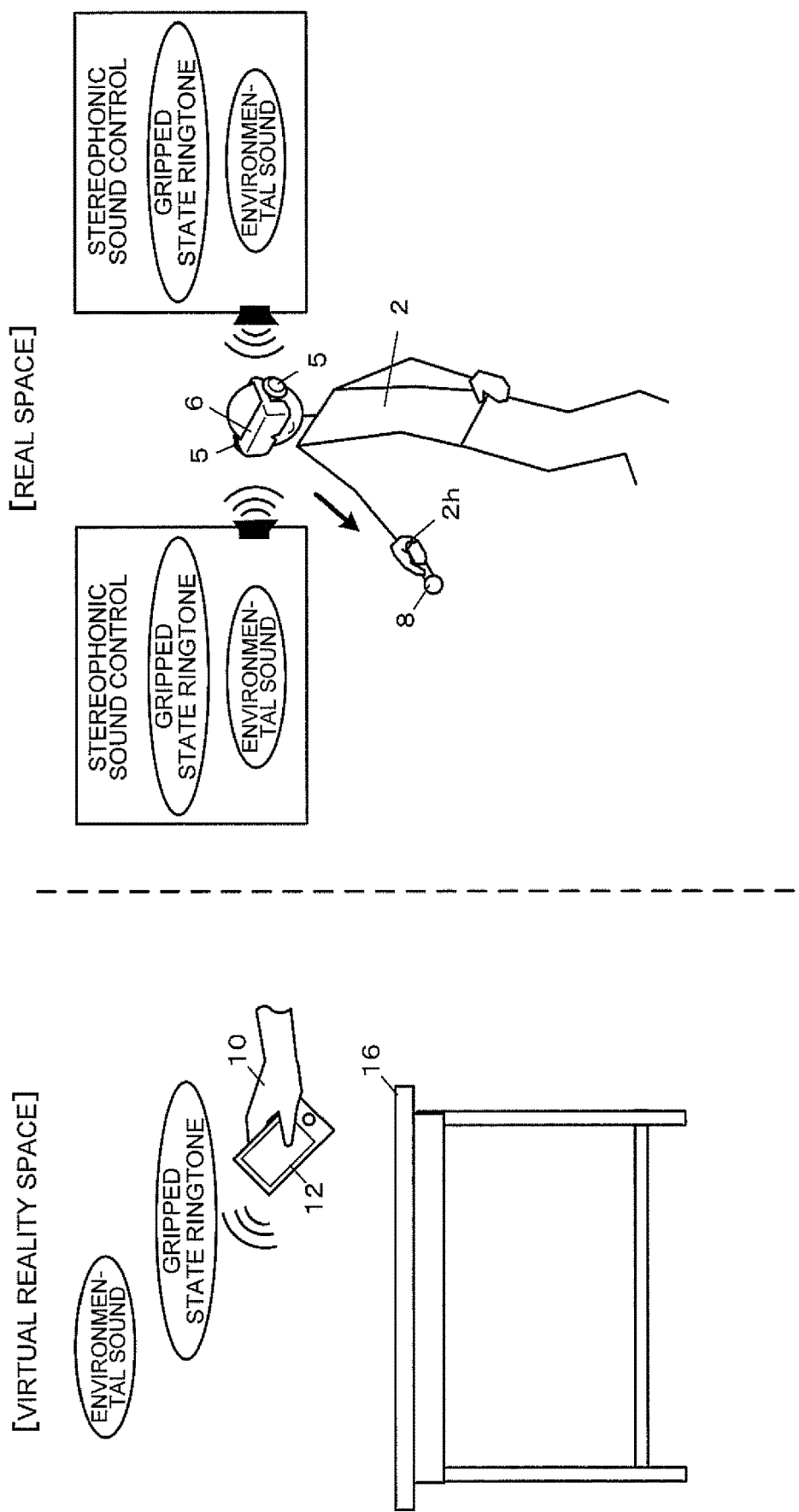
FIG. 5 is a diagram illustrating respective circumferences in the virtual reality space and the real space when the player picks up the virtual smartphone from the table.

FIG. 5 is a diagram illustrating respective circumferences in the virtual reality space and the real space when the player 2 picks up the virtual smartphone 12 from the table.

When the player 2 reaches out a hand having the controller 8 to the virtual smartphone 12, the distance between the virtual reference body 10 and the virtual smartphone 12 eventually satisfies the gripped state recognition distance condition and the virtual smartphone 12 is deemed as being gripped by the player 2. From this time, the virtual smartphone 12 is associated with the virtual reference body 10 and then moves together with the virtual smartphone 12 in the virtual reality space.

Under the sound control in this situation, the sound emitted by the virtual smartphone 12 is switched from the "non-gripped state ringtone" to a "gripped state ringtone". The "gripped state ringtone" here refers to a usual ringtone.

The gripped state recognition distance condition can be translated into a positional condition for defining the positional relationship with the virtual smartphone 12 (virtual object) as a reference point. Specifically, the gripped state recognition distance condition can be translated into a condition that the position of the right hand 2h or the controller 8 as the reference body in the real space, or the position of the virtual reference body 10 corresponding to the reference body in the virtual reality space satisfies a given positional relationship with the position of the virtual smartphone 12 as a reference point. In the following description, other "distance conditions" will appear and can also be translated into a positional condition for defining the positional relationship with the virtual object as a reference point in the same manner.

FIG. 6 is a diagram illustrating respective circumferences in the virtual reality space and the real space when the player 2 is bringing the virtual smartphone 12 toward his/her head.

In the course of bringing the virtual smartphone 12 to the head, the headphone 5 emits the "gripped state ringtone" from the virtual smartphone 12 as a mobile sound source and the environmental sound as a mixture of sounds from sound sources other than the virtual smartphone 12 under stereophonic sound control. That is, as the player 2 brings the virtual smartphone 12 closer to his/her ear, the HDM 6 provides an image of the approaching virtual smartphone 12 and the headphone 5 emits the ringtone with changes in position and gradual increase in sound volume according to the approach.

Under the sound control in this situation, there occurs a difference in sound between the right and left sides of the headphone 5. Specifically, in the present embodiment, the player 2 holds the virtual smartphone 12 by the right hand and puts the same close to the right ear and thus the environmental sound is almost the same in sound volume. However, the ringtone of the virtual smartphone 12 comes louder from the right speaker than the left speaker of the headphone 5 because of stereophonic sound control.

Figure 7:
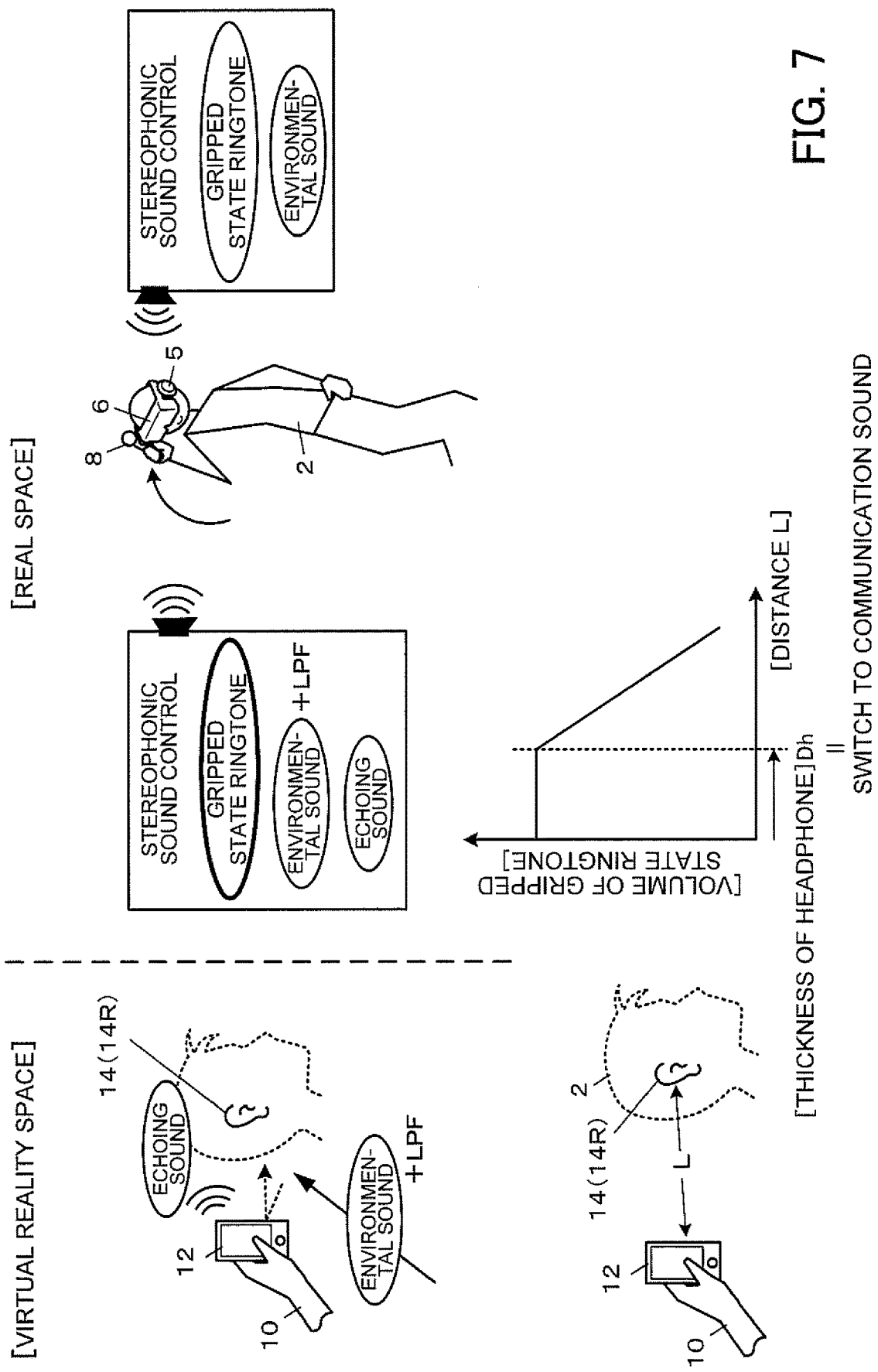
FIG. 7 is a diagram illustrating respective circumferences in the virtual reality space and the real space when the player is putting the virtual smartphone closer to his/her ear.

FIG. 7 is a diagram illustrating respective circumferences in the virtual reality space and the real space when the player 2 is putting the virtual smartphone 12 closer to his/her ear.

In the virtual reality space, the virtual reference body 10 and the virtual smartphone 12 get closer to the virtual body part 14 (the virtual right ear 14R) enough to satisfy an "echoing sound generation distance condition".

The "echoing sound generation distance condition" is a first distance condition that the player 2 hears "echoing sound", which indicates the proximity of the reference body (the right hand of the player 2 or the controller 8 in the present embodiment) to a given real target object in the real space (the right ear of the player 2 in the present embodiment). The "echoing sound generation distance condition" may be the same as a communication recognition distance condition described later.

The "echoing sound" here refers to sound generated by the ringtone of the virtual smartphone 12 (the sound originating from a virtual sound source) or the environmental sound reflecting between the virtual body part 14 and the virtual smartphone 12.

Under the sound control in this situation, the volume of the environmental sound emitted from the speaker of the headphone 5 on the side where the echoing sound generation distance condition is satisfied is reduced and subjected to low-pass filter processing so that a predetermined high frequency component included in the environmental sound is reduced or eliminated. This makes it possible to reproduce the environmental sound muffled by the approach of the virtual smartphone 12 to the virtual right ear 14R.

The "echoing sound" is selected from the sound data prepared related to the virtual smartphone 12 and is added to the stereophonic sound. Specifically, the echoing sound is added to the stereophonic sound emitted from the speaker of the headphone 5 on the side where the echoing sound generation distance condition is satisfied. No echoing sound is added to the stereophonic sound emitted from the speaker of the headphone 5 on the other side. The volume of the added echoing sound is changed to become gradually greater up to a predetermined upper limit as the distance between the virtual smartphone 12 and the virtual body part 14 (the virtual right ear 14R) becomes shorter.

Figure 8:
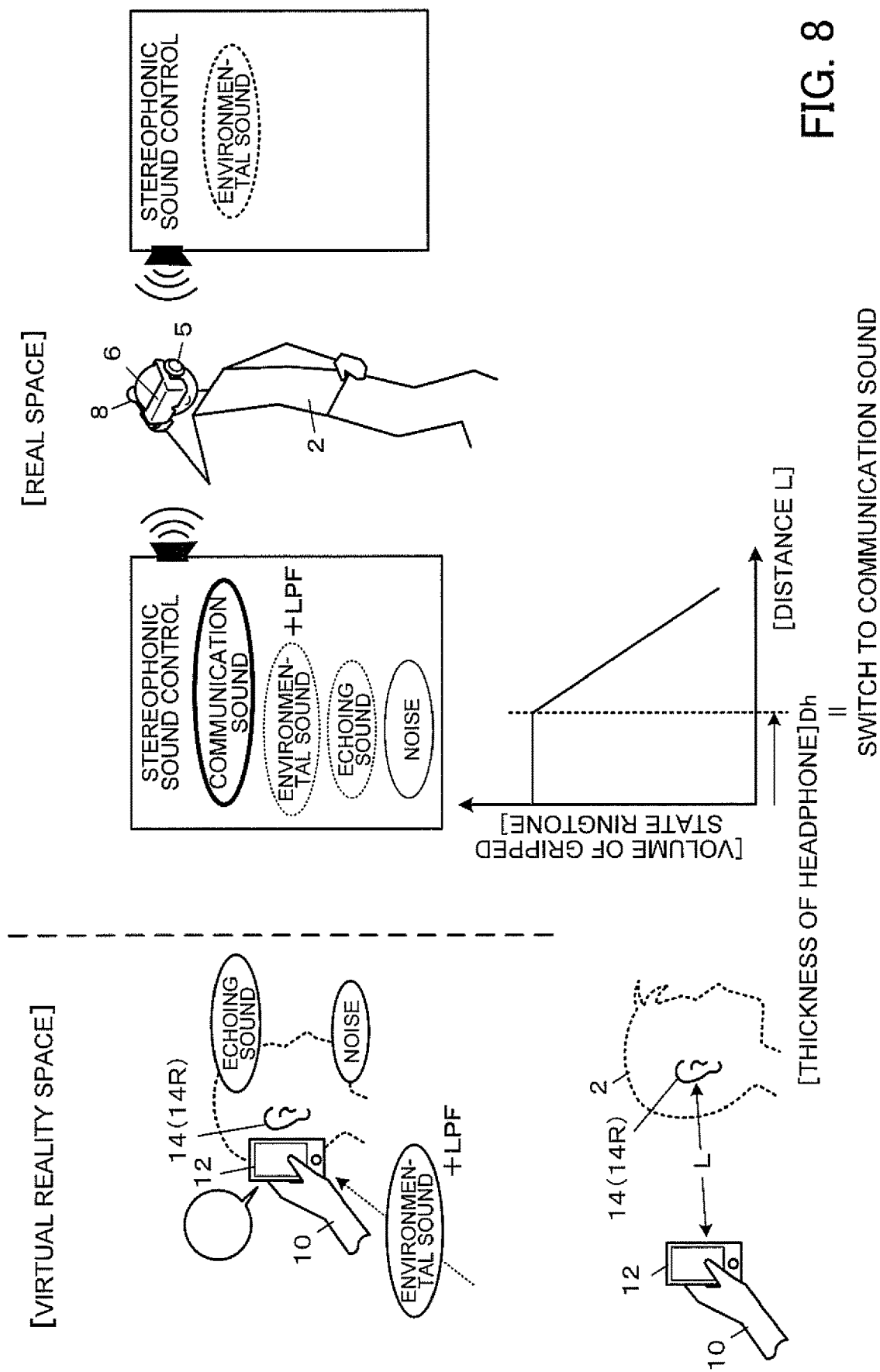
FIG. 8 is a diagram illustrating respective circumferences in the virtual reality space and the real space when the player has put the virtual smartphone closest to his/her ear with the headphone.

FIG. 8 is a diagram illustrating respective circumferences in the virtual reality space and the real space when the player 2 has put the virtual smartphone 12 closest to his/her ear with the headphone.

When the player 2 performs an action of further putting the virtual smartphone 12 closer to the virtual body part 14 (the virtual right ear 14R), the distance between them eventually becomes short enough to satisfy a predetermined "communication recognition distance condition". Accordingly, the state setting of the virtual smartphone 12 is changed from the ringing state to the communication state, and the sound originating from the virtual smartphone 12 is changed from the gripped state ringtone to "communication sound" for reproducing communications.

The "communication recognition distance condition" is a second distance condition indicating the proximity of the reference body (the right hand of the player 2 or the controller 8 in the present embodiment) to a given real target object in the real space (the right ear of the player 2 in the present embodiment). The communication state recognition distance can be set as appropriate. In the present embodiment, it is set to a value slightly greater than the thickness of the headphone 5 covering the ear. Accordingly, when performing an action as if putting the unseen smartphone sufficiently close to the ear with the headphone, the player 2 can have a feeling of automatic transition to the communication state.

Under the sound control in this situation, the communication sound is added to the stereophonic sound emitted from the speaker of the headphone 5 on the side where the communication recognition distance condition is satisfied, but is not added to the stereophonic sound emitted from the speaker on the other side. In the present embodiment, the communication sound is added to the sound emitted from the right speaker of the headphone 5 but is not added to the sound emitted from the left speaker.

In the stereophonic sound emitted from the speaker of the headphone 5 on the side where the communication recognition distance condition is satisfied, the volumes of the environmental sound and the echoing sound are more lowered than before the switching to the communication sound. This allows the player 2 to hear surely the communication sound important for the progress of the game without deterioration of reality. After the volume reduction, the volumes of the environmental sound and the echoing sound may become "0".

In the present embodiment, the communication recognition distance condition is also a "noise generation distance condition". Accordingly, when the virtual smartphone 12 gets close to the virtual body part 14 (the virtual right ear 14R) enough to satisfy the noise generation distance condition, "noise" is selected from the sound data prepared relating to the virtual smartphone 12, and added to the stereophonic sound emitted from the speaker of the headphone 5 on the side where the noise generation distance condition is satisfied. The noise generation distance condition and the communication recognition distance condition may be different from each other.

The "noise" here refers to high frequency noise, that is, white noise that is expressed as "hissing" generated by a hard object in close contact with the ear canal. The noise may be the heart sounds of the player (for example, heartbeat) depending on the contents of the game, the setting of the prop, and the purpose of effects.

In the stereophonic sound emitted from the speaker of the headphone 5 on the side where the communication recognition distance condition is not satisfied, the sound other than the communication sound is controlled to be temporally reduced in volume or not to be included at all while the communication sound is reproduced. This creates the situation where the player can listen to the communication sound with concentration.

In this way, in the present embodiment, it is possible to reproduce real sounds in the course of actions: picking up the virtual smartphone 12 seen on the HMD 6 but having no real feeling of its weight or texture; getting toward the head; putting close to the ear; and starting to use. That is, the player hears the sounds as if the relative azimuth and relative distance of the virtual smartphone 12 change gradually, and also hears even the echoing sound and noise from a certain position that would be heard when an object is put close to the ear. Further, when the virtual smartphone 12 reaches a predetermined use position (similar to the position where a smartphone would be used in the real world), the communication sound is automatically reproduced and the volumes of the other sounds are reduced (or no other sounds may be output) so that the user is allowed to listen to the communication sound in a realistic situation. This makes it possible to provide realistic and rich VR experience even in the VR environment where no tactile sense or force sense caused by holding an object can be reproduced.

In addition, the sound effects such as echoing sound and noise are added in a moderate volume to the stereophonic sound emitted from the speaker of the headphone on the side to which the virtual smartphone 12 is put close. This can be implemented by the application of a slight calculation. The sound effects can be realized even at a game device without a rich computing resource capable of physical simulation of a stereophonic sound field.

[Description of a Functional Configuration]

Figure 9:
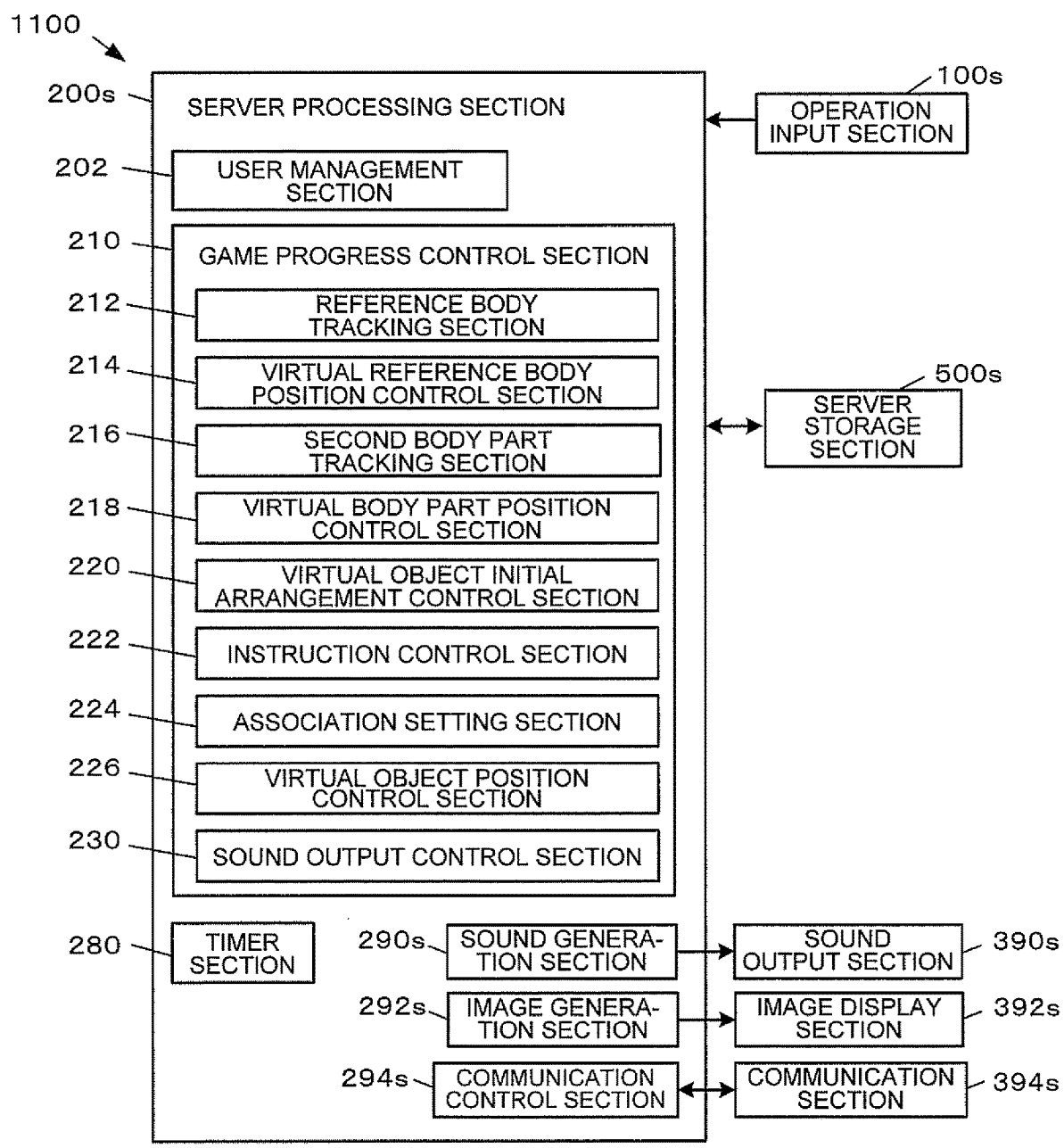
FIG. 9 is a functional block diagram illustrating an example of functional configuration of a server system.

FIG. 9 is a functional block diagram illustrating an example of functional configuration of the server system 1100 according to the present embodiment. The server system 1100 according to the present embodiment includes an operation input section 100s, a server processing section 200s, a sound output section 390s, an image display section 392s, a communication section 394s, and a server storage section 500s.

The operation input section 100s is a means for inputting various operations for management of the server system 1100 and gameplay. In the present embodiment, the HMD 6 and the tracking cameras 7 illustrated in FIG. 1 perform the function of inputting the position and direction of the sight of the player 2 and the position of the second body part, and the tracking cameras 7 and the controller 8 perform the function of inputting the position of the first body part.

The server processing section 200s is implemented with electronic parts such as a microprocessor (e.g., a CPU and a GPU), an ASIC, and an IC memory. The server processing section 200s controls data exchanged between functional sections including the operation input section 100s and the server storage section 500s. The control board 1150 in FIG. 1 corresponds to the server processing section 200s. The server processing section 200s performs various calculation processes based on a predetermined program, data, operation input signals from the operation input section 100s, data revived from the HMD 6, the controller 8, the tracking cameras 7, and the like to entirely control the operation of the server system 1100.

Specifically, the server processing section 200s according to the present embodiment includes a user management section 202, a game progress control section 210, a timer section 280, a sound generation section 290s, an image generation section 292s, and a communication control section 294s. Note that functional sections other than these may be included as appropriate.

The user management section 202 performs a process related to a user registration procedure and stores and manages the data associated with the account (user ID). In the present embodiment, the user management section 202 performs the functions of: 1) providing an account; 2) setting a virtual bank account associated with the account for use in charging for gameplay and controlling account activities, that is, electronic settlements; 3) managing login/logout; and 4) registering and managing a user's personal information. Note that management of other data can be included as appropriate.

The game progress control section 210 performs various processes related to gameplay management. Specifically, the game progress control section 210 has a reference body tracking section 212, a virtual reference body position control section 214, a second body part tracking section 216, a virtual body part position control section 218, a virtual object initial arrangement control section 220, an instruction control section 222, an association setting section 224, a virtual object position control section 226, and a sound output control section 230.

The game in the present embodiment is supposed to be played by a single player. However, to play the game in a player-versus-player (PvP) manner, the game progress control section 210 may execute a control related to the matching of players.

The reference body tracking section 212 tracks the position of the first body part of the user or the controller as a reference body in the real space. In the present embodiment, the right hand 2h of the player 2 as the first body part or the controller 8 is set as the reference body (see FIG. 3). Depending on the contents of the game and the role of the props, the first body part may be another part such as the left hand, finger, joint, leg, head, belly, back, shoulder, forehead, mouth, nose, or the like.

The virtual reference body position control section 214 arranges the virtual reference body 10 following the position of the reference body (see FIGS. 3 and 4) in the virtual reality space, and controls the virtual reference body 10 to follow the position and posture of the reference body in the real space according to the results of tracking by the reference body tracking section 212.

The second body part tracking section 216 tracks the position of the second body part of the user in the real space. In the present embodiment, the right and left ears 2E constitutes the second body part (see FIG. 3).

The virtual body part position control section 218 arranges the virtual body part 14 following the position of the second body part in the virtual reality space, and controls the virtual body part 14 to follow the position and posture of the second body part in the real space according to the result of tracking by the second body part tracking section 216 (see FIG. 3).

The virtual object initial arrangement control section 220 initially arranges a virtual object given a role in the virtual reality space. In the present embodiment, as a virtual object, the virtual smartphone 12 that is a sound emission object and a sound input/output device is initially arranged on the virtual table 16 (see FIG. 4).

The instruction control section 222 performs a control to instruct the user to put the virtual reference body 10 closer to the position of the initial arrangement.

After the provision of the instruction by the instruction control section 222, when the position of the virtual reference body 10 and the position of the virtual object or the position of its initial arrangement satisfy a predetermined condition, the association setting section 224 sets an association between the virtual object and the virtual reference body 10. That is, since the setting of the association, the virtual object is deemed as being in an incidental state in which the virtual object moves integrally with the virtual reference body 10.

The virtual object position control section 226 controls the position and posture of the virtual object. If the virtual object is set to act autonomously such as a fairy, the virtual object position control section 226 controls its action. The virtual object in the present embodiment is the virtual smartphone 12, that is, a still object. Thus, the virtual object position control section 226 causes the position of the virtual object to follow the position of the reference body or the position of the virtual reference body 10 only when the virtual object is associated with the reference body or the virtual reference body 10 by the association setting section 224 (see FIGS. 5 to 8).

The sound output control unit 230 manages a stereophonic sound field in the virtual reality space and controls the output of sounds from the stereophonic sound field at the player's position in the virtual reality space. In particular, in the present embodiment, the sound output control unit 230 determines whether a positional condition related to the virtual object for changing sound determined based on the position of the reference body in the real space or the position of the virtual object in the virtual reality space is satisfied. Based on the determination result, the sound output control unit 230 performs a sound output control such that the headphone 5 outputs the sound depending on the role of the virtual object.

More specifically, the sound output control unit 230 makes the determination under, as the positional condition for changing sound, a distance condition that indicates the proximity of the reference body (the right hand 2h) to a given real target object (the right and left ears 2E) in the real space or a distance condition that indicates the proximity of the virtual object (the virtual smartphone 12) to a virtual target object (the virtual body part 14) corresponding to the real target object in the virtual reality space (see FIG. 3).

Then, the sound output control unit 230 determines whether each of the user's right and left ears satisfies the positional condition. When either of the ears satisfies the positional condition, the sound output control unit 230 outputs stereophonic sound from a right or left output of the headphone 5 corresponding to the ear satisfying the positional condition as if the sound emission object in the virtual reality space has become close to the ear.

Focusing on the handling of the environmental sound, the sound output control unit 230 acts as an environmental sound change control unit that changes the environmental sound based on the position of the reference body in the real space or the position of the virtual object in the virtual reality space.

That is, when the positional condition for changing sound is not satisfied, the sound output control unit 230 can output not the sound according to the role of the virtual object but the environmental sound in the virtual reality space or output the environmental sound in the virtual reality space louder than the sound according to the role. When the positional condition for changing sound is satisfied, the sound output control unit 230 outputs not the environmental sound in the virtual reality space but the sound according to the role or outputs the sound according to the role louder than the environmental sound in the virtual reality space.

As part of the operation, when the positional condition for changing sound is not satisfied, the sound output control unit 230 outputs the environmental sound in the virtual reality space, and when the positional condition is satisfied, the sound output control unit 230 outputs the environmental sound in the virtual reality space lower in volume and attenuated in the high-tone range.

Focusing on the volumes of the right and left sides of the headphone 5, the sound output control unit 230 determines whether each of the user's right and left ears satisfies the positional condition for changing sound. When either of the ears satisfies the positional condition, the sound output control unit 230 reduces the sound from the right or left output of the headphone 5 corresponding to the ear not satisfying the positional condition.

In addition, the sound output control unit 230 can further output given echoing sound and noise.

The timer section 280 uses a system clock to obtain the current date and time, a time limit, and the like.

The sound generation section 290s is implemented by a circuit, an IC, or execution of software that performs generation, synthesis, decoding of sound data, and generates or decodes sound data such as stereophonic sound, operation sound, and BGM related to the system management of the server system 1100 and gameplay. The sound generation section 290s outputs signals of the sound related to the system management and the sound related to gameplay to the sound output section 390s.

The sound output section 390s reproduces and emits sounds from the sound signals. In the example of FIG. 1, the headphone 5 and a speaker integrally included in the touch panel 1108 (not illustrated) correspond to the sound output section 390s.

The image generation section 292s generates images related to the system management of the server system 1100 and images necessary for gameplay, and outputs the same to the image display section 392s.

The image display section 392s displays various images for system management and images necessary for gameplay based on the image signals from the image generation section 292s. The image display section 392s can be implemented by an image display device such as a flat panel display, a cathode ray tube (CRT), a projector, or a head-mounted display. In the example of FIG. 1, the HMD 6 and the touch panel 1108 correspond to the image display section 392s.

The communication control section 294s performs data processing related to data communications, and exchanges data with external devices (the headphone 5, the HMD 6, the tracking cameras 7, and the controller 8 in the present embodiment) through the communication section 394s.

The communication section 394s connects to the communication line 9 to implement communications. The communication section 394s is implemented by a transceiver, a modem, a terminal adapter (TA), a jack for a wired communication cable, a control circuit, and the like. The communication section 394s corresponds to the communication device 1153 in the example of FIG. 1.

The server storage section 500s stores programs and various types of data for implementing various functions of the server processing section 200s for entirely controlling the server system 1100. The server storage section 500s is used as a work area for the server processing section 200s, and temporarily stores the results of calculations performed by the server processing section 200s according to the various programs. The functions of the server storage section 500s are implemented by an IC memory (e.g., RAM and ROM), a magnetic disk (e.g., hard disk), an optical disk (e.g., CD-ROM and DVD), an online storage, or the like. The IC memory 1152 corresponds to the server storage section 500s in the example of FIG. 1.

Figure 10:
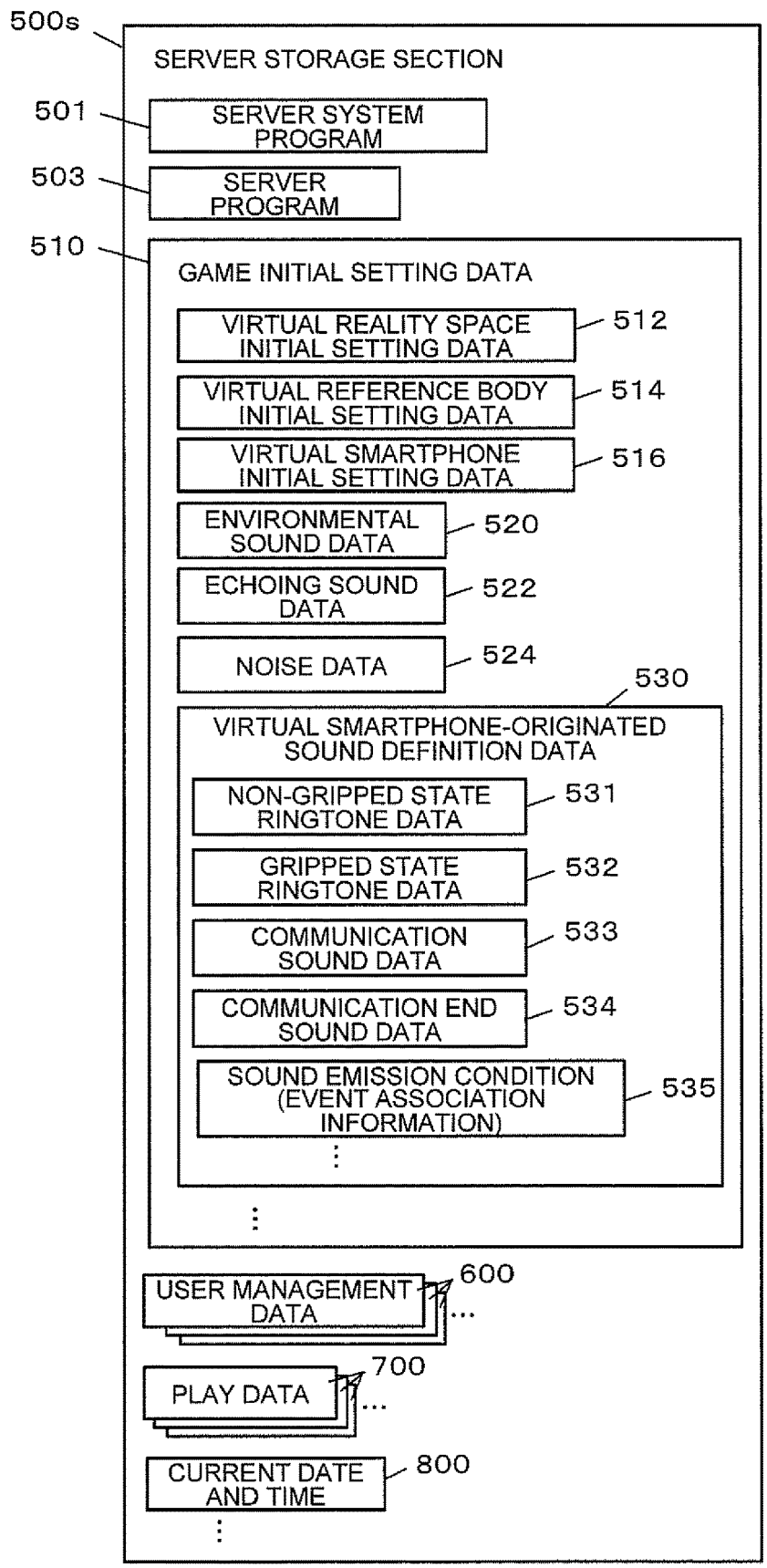
FIG. 10 is a diagram illustrating examples of programs and data stored in a server storage section.

FIG. 10 is a diagram illustrating examples of programs and data stored in the server storage section 500s according to the present embodiment. The server storage section 500s stores therein in advance, a server system program 501, a server program 503, and game initial setting data 510. The server storage section 500s stores user management data 600, play data 700, and current date and time 800 as data sequentially generated and managed. Furthermore, the server storage section 500s can store information on a timer, a counter, various flags, and the like as appropriate.

The server system program 501 is read and executed by the server processing section 200s to cause the server system 1100 to perform basic input/output functions as a computer.

The server program 503 is read and executed by the sever processing section 200s to perform the functions of the user management section 202, the game progress control section 210, and the timer section 280.

The game initial setting data 510 includes various types of initial setting data related to the game.

In the present embodiment, the game initial setting data 510 includes virtual reality space initial setting data 512, virtual reference body initial setting data 514, virtual smartphone initial setting data 516, environmental sound data 520, echoing sound data 522, noise data 524, and virtual smartphone-originated sound definition data 530. Note that other data can be included as appropriate.

The virtual reality space initial setting data 512 includes model data, texture data, and initial arrangement position data of various objects (for example, the virtual table 16 illustrated in FIG. 4) constituting the virtual reality space.

The virtual reference body initial setting data 514 includes model data, texture data, and initial arrangement position data of the virtual reference body 10 (see FIG. 4).

The virtual smartphone initial setting data 516 includes model data, texture data, and initial arrangement position data of the virtual smartphone 12 (see FIG. 4).

The environmental sound data 520 is sound data of the environmental sound (see FIG. 6) or basic data for generating that sound data.

The echoing sound data 522 is sound data of echoing sound (see FIG. 7) or basic data for generating that sound data.

The noise data 524 is sound data of noise (see FIG. 8) or basic data for generating that sound data.

The virtual smartphone-originated sound definition data 530 includes sounds originated from the virtual smartphone 12, in other words, data for defining various kinds of sounds emitted from the virtual smartphone 12.

In the present embodiment, the virtual smartphone-originated sound definition data 530 includes: 1) non-gripped state ringtone data 531 as sound data of the non-gripped state ringtone (see FIG. 4) or basic data for generating that sound data; 2) gripped state ringtone data 532 as sound data of the gripped state ringtone (see FIG. 5) or basic data for generating that sound data; 3) communication sound data 533 as sound data of the communication sound (see FIG. 8) or basic data for generating that sound data; 4) communication end sound data 534 as sound data of sound after the end of communication or basic data for generating that sound data; and 5) a sound emission condition 535 for defining a condition for using the definition data.

The data of the virtual smartphone-originated sound included in the virtual smartphone-originated sound definition data 530 can also be applied as appropriate to data other than the non-gripped state ringtone data 531, the gripped state ringtone data 532, the communication sound data 533, and the communication end sound data 534. The sounds originated from the virtual smartphone 12 can include as appropriate sound effects generated by the virtual smartphone 12 contacting or colliding with another object, for example. If the virtual smartphone 12 is set to have a spirit dwelling therein, the sprit's voice can be included.

The sound emission condition 535 can be set as appropriate. In the present embodiment, the sound emission condition 535 is that a given event has occurred, has been executed, or has been attained in the game (event clear condition). Thus the sound emission condition 535 is also information for defining an association with the event. Specifically, the sound emission condition 535 may be an event clear condition that, after the start of the game, the player 2 has walked around for a predetermined time in the virtual reality space and known the existence of a given character or become acquainted with the character, for example. Alternatively, the sound emission condition 535 may be an event clear condition that the player 2 has encountered a given situation in the game (for example, a communication event has occurred or a given incident has occurred, or the like).

In relation to the present embodiment, the single virtual smartphone-originated sound definition data 530 is illustrated and described for the ease of understanding. In actuality, however, setting different sound emission conditions 535 and preparing the virtual smartphone-originated sound definition data 530 for each of the sound emission conditions 535 makes it possible to realize different sounds (communications) according to various situations by a single virtual object (the virtual smartphone 12).

The user management data 600 includes various types of data that is prepared for each registered user and is associated with the account as unique identification information. The one user management data 600 may include as appropriate, for example, the user's unique account, registration date and time, the balance of the bank account for virtual currency to be used in payment for purchased game items, login history data, and others.

Figure 11:
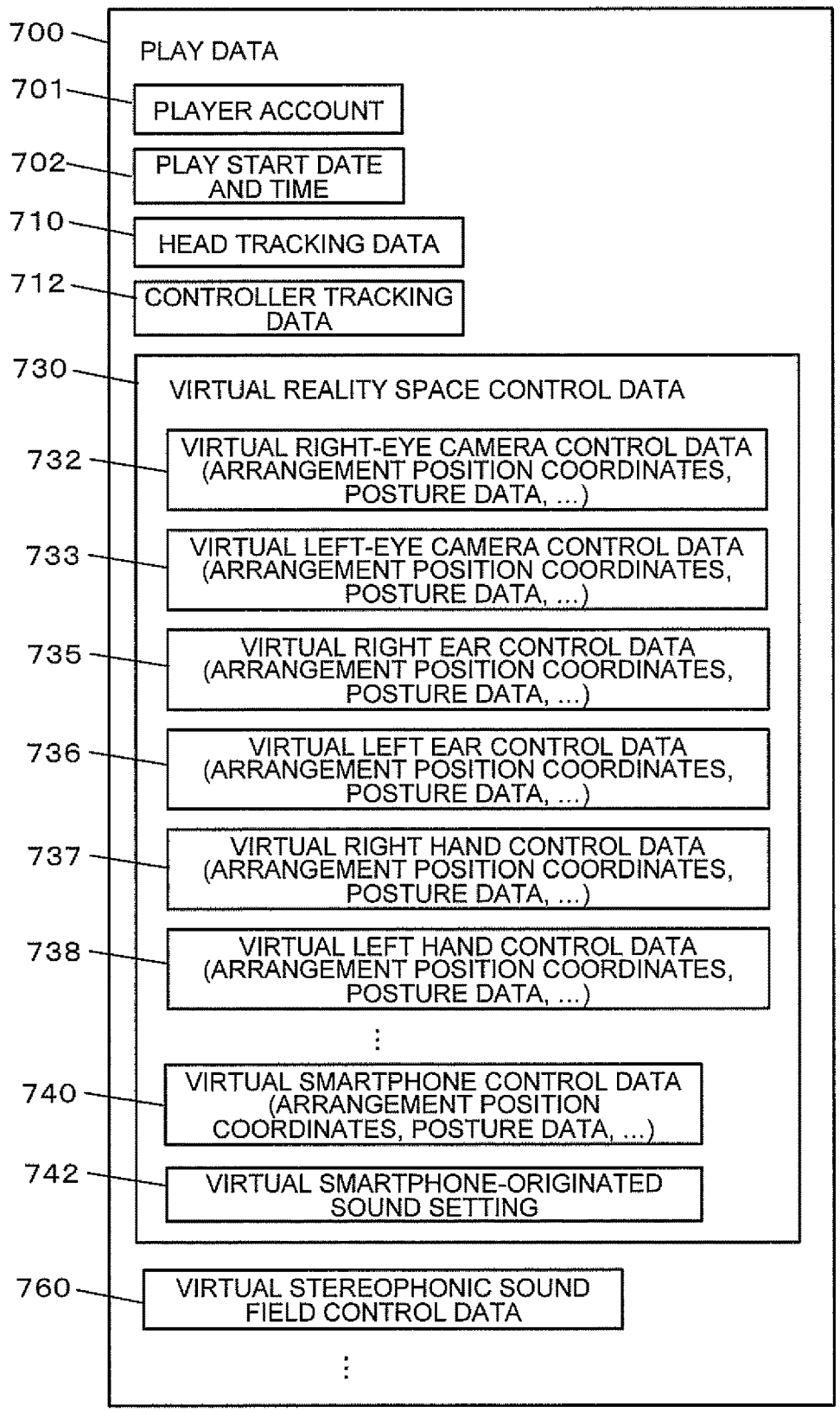
FIG. 11 is a diagram illustrating a data configuration example of play data.

The play data 700 includes various types of data that is provided at each gameplay and describes the progress of the game. The one play data 700 includes a player account 701, gameplay start date and time 702, head tracking data 710, controller tracking data 712, virtual reality space control data 730, and virtual stereophonic sound field control data 760, as illustrated in FIG. 11, for example.

The virtual reality space control data 730 includes control data for various elements set in the virtual reality space. In the present embodiment, the virtual reality space control data 730 includes virtual right-eye camera control data 732, virtual left-eye camera control data 733, virtual right ear control data 735, virtual left ear control data 736, virtual right hand control data 737, virtual left hand control data 738, virtual smartphone control data 740, and virtual smartphone-originated sound setting 742.

The player account 701 is set to the registered account of a player having logged in.

The gameplay start date and time 702 is set to current login date and time 800.

The head tracking data 710 and the controller tracking data 712 are respectively tracking data of the positions and postures of the HMD 6 and the controller 8 in the play field, which are updated in sequence according to the tracking process.

The virtual right-eye camera control data 732 and the virtual left-eye camera control data 733 are control data for the virtual right-eye camera and the virtual left-eye camera set to the head of the player 2 in the virtual reality space, each of which includes arrangement position coordinates and posture data in the virtual reality space and is changed in sequence based on the head tracking data 710. The virtual right-eye camera and the virtual left-eye camera take images of the virtual reality space that will be displayed respectively for a right-eye image and a left-eye image on the HMD 6.

The virtual right ear control data 735 and the virtual left ear control data 736 are control data for the virtual right ear 14R and the virtual left ear 14L set to the head of the player 2 in the virtual reality space (see FIG. 3), each of which includes arrangement position coordinates and posture data in the virtual reality space and is changed in sequence based on the head tracking data 710. The virtual right ear control data 735 and the virtual left ear control data 736 correspond to the control data for the virtual body part 14 in the present embodiment.

The virtual right hand control data 737 and the virtual left hand control data 738 are control data for the virtual right hand and the virtual left hand of the player 2 in the virtual reality space, each of which includes arrangement position coordinates and posture data in the virtual reality space and is changed in sequence based on the head tracking data 710. The virtual right hand control data 737 corresponds to the virtual reference body 10 in the present embodiment (see FIG. 3).

The virtual smartphone control data 740 is control data for the virtual smartphone 12, which includes arrangement position coordinates and posture data in the virtual reality space.

The virtual smartphone-originated sound setting 742 includes the setting of type of sound originated from the virtual smartphone 12. In the present embodiment, any of "no sound", "non-gripped state ringtone", "gripped state ringtone", "communication sound", and "communication end sound" is selected.

The virtual stereophonic sound field control data 760 includes various types of data for controlling a virtual stereophonic sound field in the virtual reality space. For example, the virtual stereophonic sound field control data 760 includes the sound source position coordinates, sound emission direction, sound volume setting, and others for each sound source in the virtual reality space.

[Description of Operations]

Next, a flow of a process in the server system 1100 will be described. The flow of the process described herein is implemented by the server processing section 200$s$ executing the server system program 501 and the server program 503.

Figure 12:
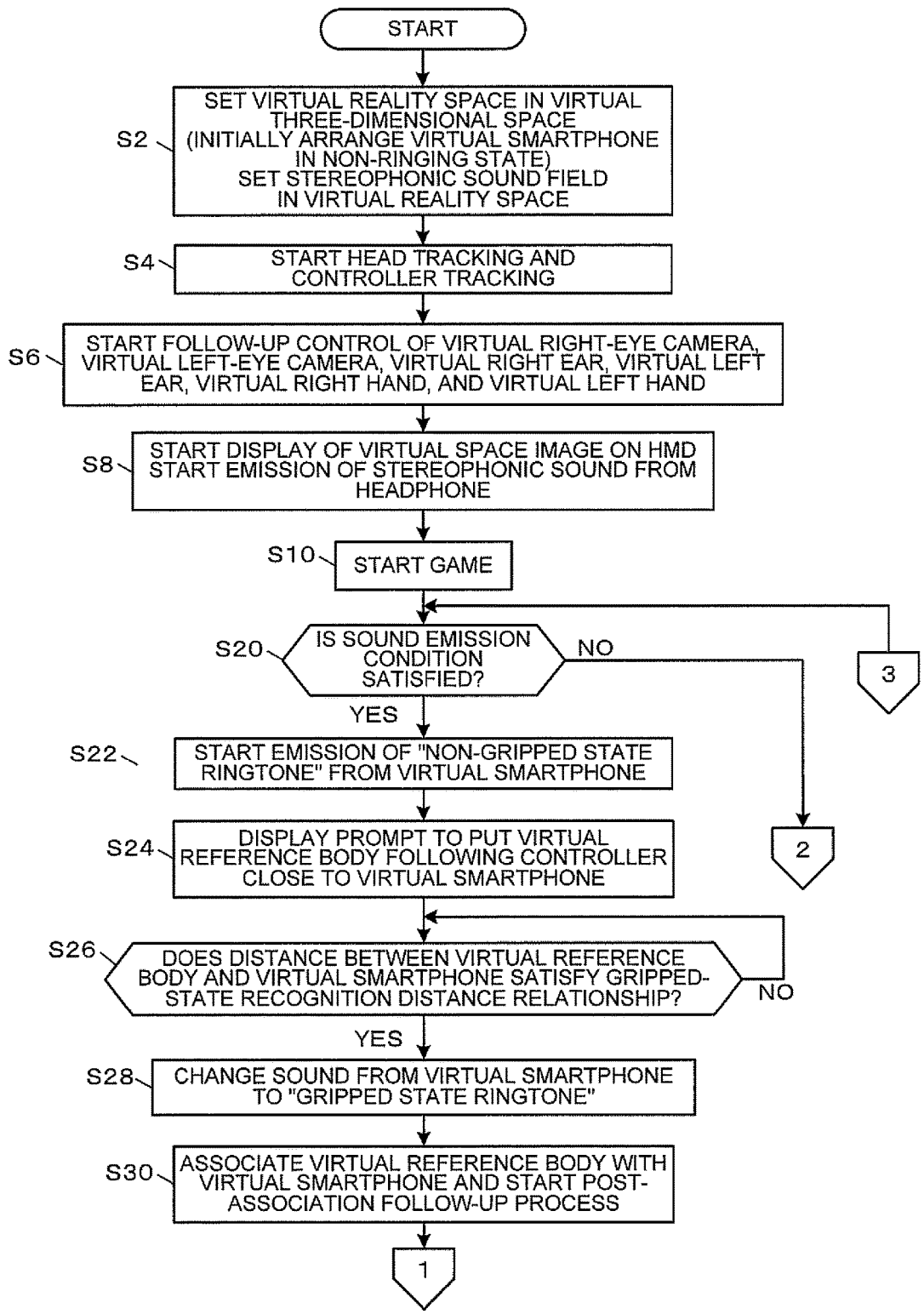
FIG. 12 is a diagram illustrating a data configuration example of a flowchart for describing a flow of a process in the server system.
Figure 13:
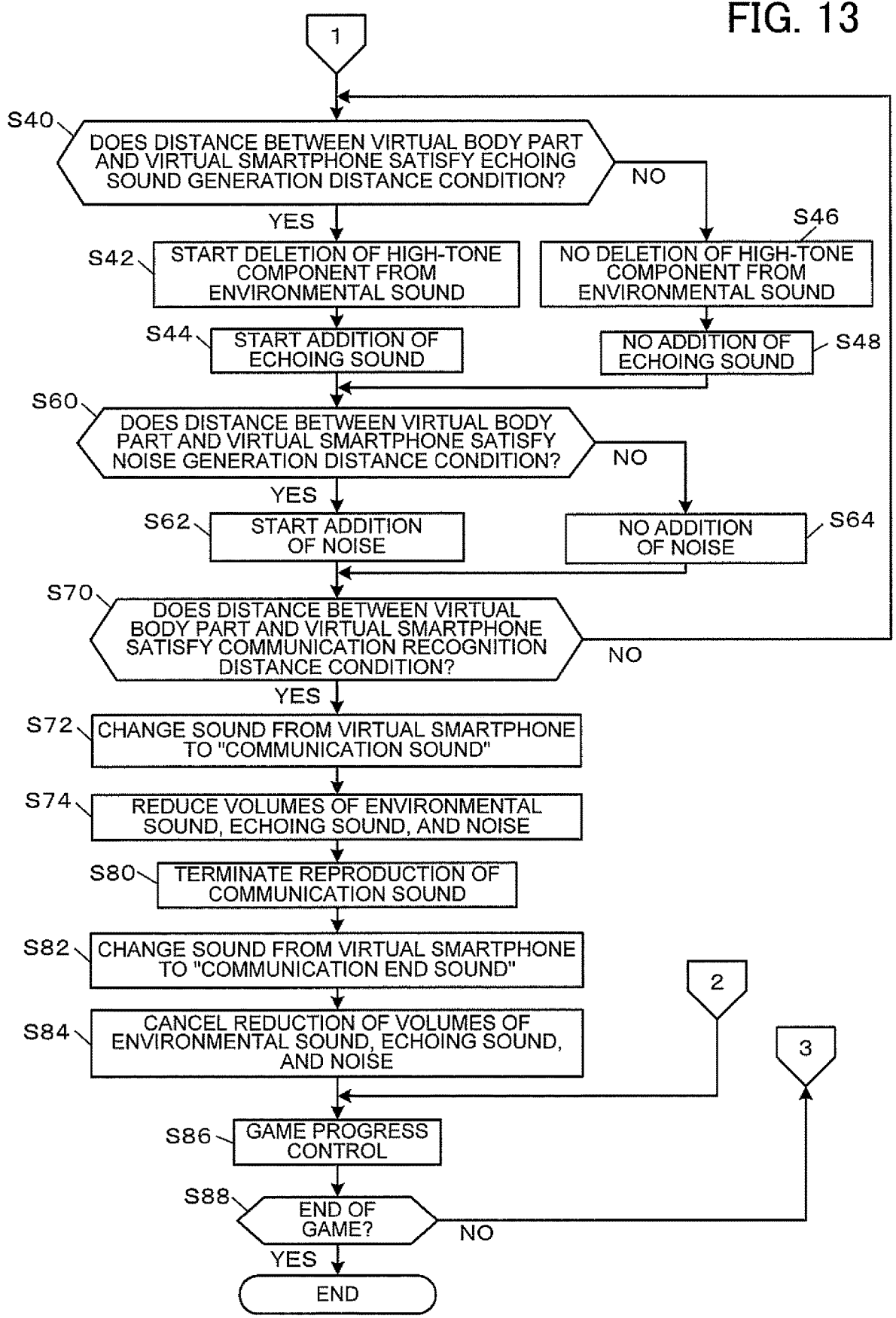
FIG. 13 is a flowchart continuing from FIG. 12.

FIGS. 12 and 13 are a flowchart of a process for describing the beginning part of the gameplay by the player 2 who picks up the virtual smartphone 12 and performs communications to grasp his/her situation in the game world and then starts actually the game.

First, as illustrated in FIG. 12, the server system 1100 prepares new play data 700 for the user having logged in, forms a virtual reality space in which various objects are arranged based on the virtual reality space initial setting data 512 (see FIG. 10), and sets a stereophonic sound field in the virtual reality space (step S2). For the stereophonic sound field, a sound source producing environmental sound is initially set. At this time, the virtual smartphone 12 is initially arranged in a non-ringing state on the virtual table 16.

Next, the server system 1100 prompts the player to enter the play field, put the HMD 6 on the head, and hold the controller 8 by one hand, and then starts head tracking and controller tracking (step S4). Then, the server system 1100 starts the follow-up control of the virtual right-eye camera, the virtual left-eye camera, the virtual right ear, and the virtual left ear according to the head tracking, and starts the follow-up control of the virtual right hand and the virtual left hand according to the controller tracking (step S6).

The server system 1100 then starts the control for displaying a virtual space image (VR image) on the HMD 6, and starts the control for emitting stereophonic sound from the headphone 5 (step S8). This makes it possible to provide the player 2 with a view field and surround sound as if the player 2 exists in the virtual reality space.

After the player 2 starts gameplay (step S10), the server system 1100 determines whether the sound emission condition 535 is satisfied (step S20).

When the sound emission condition 535 is satisfied (YES in step S20), the server system 1100 starts the emission of the "non-gripped state ringtone" from the virtual smartphone 12 (step S22, see FIG. 4). Accordingly, the virtual smartphone 12 is added to the virtual stereophonic field so that the player 2 hears the ringtone of the virtual smartphone 12 via the headphone 5.

Next, the server system 1100 provides a display that prompts the player to answer the call on the virtual smartphone 12 (step S24). Specifically, the server system 1100 provides a display that prompts the player to put the virtual reference body following the position of the controller 8 close to the virtual smartphone 12. These displays may be omitted.

The server system 1100 determines whether the player 2 has reached out a hand for the virtual smartphone 12 so that the distance between the virtual reference body 10 and the virtual smartphone 12 has eventually satisfied the gripped state recognition distance condition (step S26).

The foregoing determination may not be necessarily made based on the distance between the virtual reference body 10 and the virtual smartphone 12 but may be made based on a positional condition that the virtual reference body 10 has reached a predetermined range set with the current position of the virtual smartphone 12 in the virtual reality space (in the present embodiment, the virtual smartphone 12 is a still object and thus the initial arrangement position is applied) as a reference point.

When the result of the determination is affirmative (YES in step S26), the server system 1100 changes the sound emitted from the virtual smartphone 12 to the "gripped state ringtone" (step S28). The server system 1100 also regards the virtual smartphone 12 as being gripped by the virtual reference body 10 (the virtual right hand in the present embodiment) and associates them with each other, and starts a post-association follow-up process to cause the position and posture of the virtual smartphone 12 to follow the virtual reference body 10 while maintaining a predetermined relative positional relationship between the virtual smartphone 12 and the virtual reference body (step S30, see FIGS. 5 and 6).

The server system 1100 also determines whether the player 2 has continued to bring the virtual smartphone 12 toward to the head and a distance L between the virtual body part 14 (the virtual right ear 14R) and the virtual smartphone 12 or the virtual reference body 10 (the virtual right hand) has eventually become short enough to satisfy the echoing sound generation distance condition (step S40).

The foregoing determination may not be necessarily made based on the distance between the virtual body part 14 and the virtual smartphone 12 or the virtual reference body 10 but may be made based on a positional condition that the virtual smartphone 12 or the virtual reference body 10 has reached a predetermined range set with the virtual body part 14 as a reference point.

When the result of the determination is affirmative (YES in step S40), the server system 1100 reduces the volume of the environmental sound in stereophonic sound emitted from the speaker of the headphone 5 on the side where the echoing sound generation distance condition is satisfied (the right side in the present embodiment), and applies low-pass filter processing to the environmental sound to start the deletion of a predetermined high-frequency component (step S42, see FIG. 7). Then, the server system 1100 starts the control for adding the echoing sound to the sound emitted from the speaker of the headphone 5 on the side where the echoing sound generation distance condition is satisfied (step S44).

In contrast, when the virtual body part 14 and the virtual smartphone 12 or the virtual reference body 10 are separated from each other so that the distance L between them no longer satisfies the echoing sound generation distance condition (NO in step S40), the server system 1100 stops the reduction of the volume of the environmental sound and the deletion of the high-frequency component in step S44 (step S46), and also stops the addition of the echoing sound (step S48).

Further, the server system 1100 determines whether the player 2 has continued to put the virtual smartphone 12 closer to the ear and the virtual body part 14 and the virtual smartphone 12 or the virtual reference body 10 have eventually become close to each other so that the distance L between them satisfies the noise generation distance condition (step S60).

The foregoing determination may not be necessarily made based on the distance between the virtual body part 14 and the virtual smartphone 12 or the virtual reference body 10 but may be made based on a positional condition that the virtual smartphone 12 or the virtual reference body 10 has reached a predetermined range set with the virtual body part 14 as a reference point.

When the result of the determination is affirmative (YES in step S60), the server system 1100 starts a control for adding noise to the stereophonic sound emitted from the right speaker of the headphone 5 (step S62, see FIG. 8). In contrast, when the noise generation distance condition is no longer satisfied (NO in step S60), the server system 1100 stops the control for adding the noise (step S64).

Then, the server system 1100 determines whether the distance L between the virtual body part 14 and the virtual smartphone 12 or the virtual reference body 10 satisfies the communication recognition distance condition (step S70).

In other words, the server system 1100 determines that the virtual body part 14 (the virtual right ear 14R) as a virtual target object in the virtual reality space corresponding to the real target object as the right ear 2E (the second body part, see FIG. 2) of the player 2 and the virtual smartphone 12 as a virtual object have become close to each other at a level equal to or greater than a threshold.

The foregoing determination may not be necessarily made based on the distance between the virtual body part 14 and the virtual smartphone 12 or the virtual reference body 10 but may be made based on a positional condition that the virtual smartphone 12 or the virtual reference body 10 has reached a predetermined range set with the virtual body part 14 as a reference point.

When the result of the determination is affirmative (YES in step S70), the server system 1100 switches the sound emitted from the virtual smartphone 12 to the "communication sound" (step S72, see FIG. 8).

The server system 1100 further reduces the volumes of the sounds other than the communication sound (step S74). Specifically, the server system 1100 sets the communication sound as appropriate according to the contents of the game. In the present embodiment, the server system 1100 sets the communication sound such that the communication partner provides information allowing the player to understand his/her situation and the game end condition over the phone. The server system 1100 reduces the sound components other than the communication sound out of the stereophonic sound emitted from the speaker of the headphone 5 on the side to which the virtual smartphone 12 was put close (the right side in the present embodiment) as compared to the state before the start of the communication sound so that the player mainly hears the communication sound. In addition, the server system 1100 reduces the volume of the entire stereophonic sound emitted from the speaker of the headphone on the side opposite to the side to which the virtual smartphone 12 was put close (the left side in the present embodiment) to be lower than that on the right side.

At the end of the communication sound (step S80), the server system 1100 switches the sound emitted from the virtual smartphone 12 to the "communication end sound" (step S82), and cancels the reduction of the sound started in step S74 (step S84). Then, the server system 1100 determines that the player has been provided with sufficient prerequisite information by the foregoing virtual communication, and controls the actual progress of the game until the end of the game (step S86).

At the end of the game (YES in step S88), the server system 1100 terminates the series of processes.

According to the present embodiment, it is possible to provide a VR-related sound control technique that further enhances a sense of reality in scenes where the user uses a virtual prop in a virtual reality space.

In the present embodiment, the prop in the game is assumed as a virtual smartphone. However, various kinds of props can appear in actual operations. Also in that case, each of the props can be processed in the same manner as the virtual smartphone 12 in the present embodiment to obtain the same advantageous effects.

[Modifications]

An example of an embodiment to which the present invention is applied has been described so far. Note that the present invention is not limited to the foregoing embodiment. Various modifications may be made as appropriate, such as adding other elements, omitting some of the elements, or changing some of the elements.

[First Modification]

For example, in the game of the foregoing embodiment, the player uses various props in a virtual reality space to communicate with persons in the virtual reality space and fulfill missions. However, the genre and contents of the game can be set as appropriate. In addition, instead of the game, VR experience may be provided to the user who will travel and explore a virtual world.

[Second Modification]

The types and number of virtual objects can be set as appropriate. The sizes and characteristics of virtual objects in the virtual reality space can be set as appropriate according to their roles in the virtual reality space.

To introduce a plurality of types of virtual objects, initial setting data and virtual object-originated sound definition data are prepared for the individual types of the virtual objects. In the foregoing embodiment as an example, to introduce a plurality of virtual smartphones 12 different in machine model, the virtual smartphone initial setting data 516 and the virtual smartphone-originated sound definition data 530 are prepared to include data of unique virtual object IDs in association with the individual machine models (see FIG. 10).

The virtual object is not limited to the virtual smartphone 12. The virtual object may be sized capable of being handheld or may be too large to carry by the player. Specifically, setting the virtual object to a wall in the virtual reality space and setting the reference body and the second body part to the right and left ears would make it possible to, when the player puts his/her ear against the wall or approaches the wall, reproduce the sound from the headphone 5 as if the player hears it over the wall.

[Third Modification]

Figure 14:
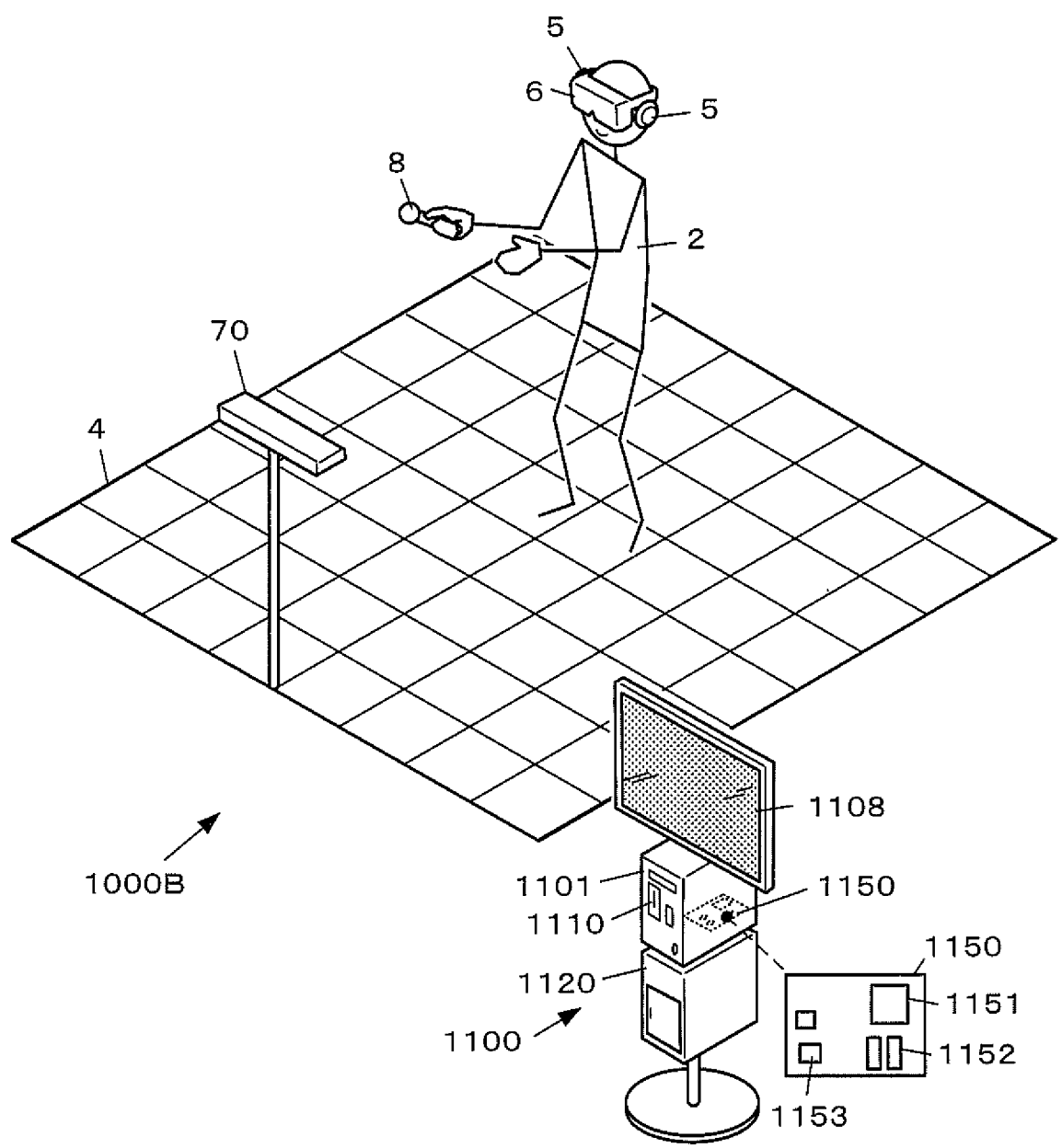
FIG. 14 is a diagram illustrating a modification of a game system.

The tracking technique can be selected as appropriate as described above. For example, instead of the head tracking and the controller tracking in the present embodiment, a gesture recognition technique can be used to recognize the motion of the bone structure of the player 2 by a camera taking frontal shots of the player 2 and a sensor unit 70 including a distance measurement sensor measuring the distances to the parts of the front side of the player 2 as in a game system 1000B illustrated in FIG. 14, for example. In this case, rather than the controller 8, the first body part (hand) carrying the controller 8 is tracked.

When the motion of the entire bone structure can be recognized by gesture recognition, the second body part corresponding to the virtual right ear 14R in the foregoing embodiment can be set as appropriate, not limited to the ear.

The role of the prop is not limited to a mobile sound source but may be a sound input device that inputs sound in the virtual reality space. For example, the prop can be set to a portable prop that collects sound such that the player can hear the sounds by the headphone 5, such as a microphone (for example, a virtual sound collection device 17).

Figure 15:
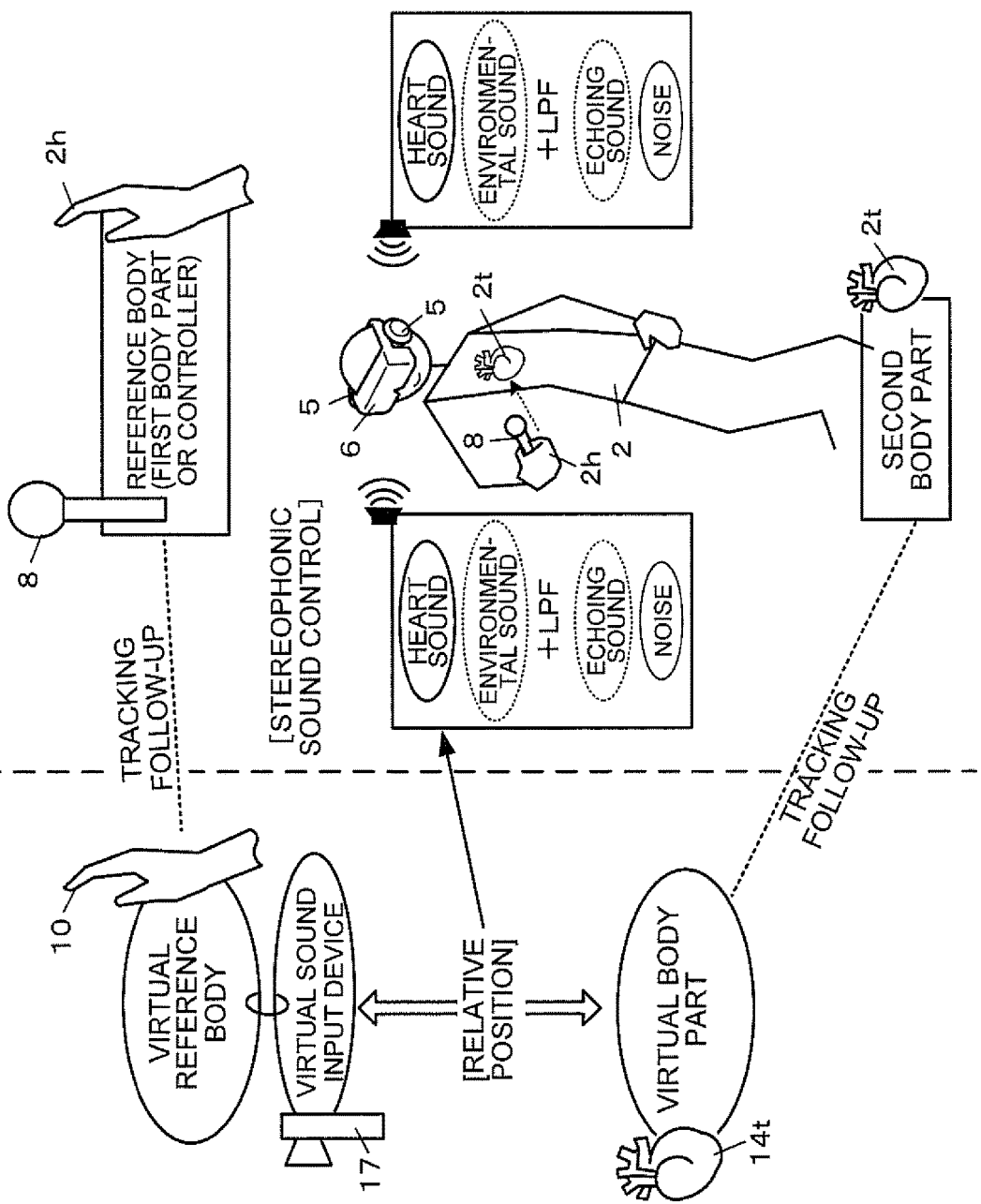
FIG. 15 is a conceptual diagram for describing a principle of sound control in a scene in which the player holds and uses a prop assigned the role of a sound input device.

More specifically, as illustrated in FIG. 15, the second body part is set to a heart 2t of the player 2, and an invisible virtual heart 14t is set as a virtual body part in the virtual reality space. The sound collected by the virtual sound collection device 17 is initially set to "no sound".

When the player 2 starts the game and moves the virtual sound collection device 17 toward his/her chest and the relative positions of the virtual sound collection device 17 and the virtual heart 14t become close to each other enough to satisfy a sound collectable distance condition, the sound collected by the virtual sound collection device 17 may be switched to predetermined "heart sound (sound emitted from the second body part)" so that the heart sound is reproduced from the headphone 5. The environmental sound, echoing sound, and noise may be handled in the same manner as in the foregoing embodiment.

As another example, the following assignments are possible:

First reference body: the player's right hand (first body part A)

Second reference body: the player's left hand (first body part B)

First virtual reference body: virtual right hand

Second virtual reference body: virtual left hand

Second body part: the player's trunk

The virtual object and its role: a belt buckle-type item with a transformation function Controlling the sound related to the virtual object as described below would makes it possible to reproduce a hero's transformation belt in the virtual reality space.

1) No sound is made in the initial setting (meaning that the virtual object is not activated).

2) When the virtual object and the virtual right hand or the virtual left hand become close to each other, the virtual object and the virtual right hand or the virtual left hand are associated with each other. From then on, the virtual object is moved following the virtual right hand or the virtual left hand.

3) When the virtual object become close to the second body part, the association between the virtual object and the virtual right hand or the virtual left hand is canceled. The virtual object and the second body part are newly associated with each other, the virtual object is arranged in close contact with the front side of the player's waist, and the sound is changed to activation preparation sound.

4) When the virtual right hand and the virtual left hand are respectively brought into the right side and left side of the virtual object, the sound is changed to activation sound and the transformation function is performed in the virtual reality space.

Although only some embodiments of the present invention have been described in detail above, those skilled in the art will readily appreciate that many modifications are possible in the embodiments without materially departing from the novel teachings and advantages of this invention. Accordingly, all such modifications are intended to be included within scope of this invention.

What is claimed is:

1. A control method for use with a user, the control method comprising:
   tracking a position of a reference body in a real space, the reference body being a first body part of the user or a controller;
   displaying an image of a virtual reality space associated with the real space on a head tracking-type head mounted display (HMD) worn by the user;
   associating a position of a virtual object given a role in the virtual reality space with the position of the reference body to follow the position of the reference body;
   performing a control to output sound according to the role from a headphone worn by the user based on whether a positional condition for changing sound determined based on the position of the reference body in the real space or the position of the virtual object in the virtual reality space is satisfied, wherein:
   the control of the output sound is performed such that:
   when the positional condition is not satisfied: (a) the sound according to the role is not output and instead environmental sound in the virtual reality space is output, or (b) the environmental sound in the virtual reality space is output louder than the sound according to the role, and
   when the positional condition is satisfied: (i) the environmental sound in the virtual reality space is not output and instead the sound according to the role is output, or (ii) the sound according to the role is output louder than the environmental sound in the virtual reality space.

2. The control method according to claim 1, further comprising changing the environmental sound based on the position of the reference body in the real space.

3. The control method according to claim 1, further comprising changing the environmental sound based on the position of the virtual object in the virtual reality space.

4. The control method according to claim 1, wherein the output control of the sound includes determining whether the positional condition is satisfied, the positional condition being a distance condition that a given real target object in the real space and the reference body has become close to each other.

5. The control method according to claim 1, wherein the output control of the sound includes determining whether the positional condition is satisfied, the positional condition being a distance condition that a virtual target object in the virtual reality space corresponding to the real target object and the virtual object has become close to each other.

6. The control method according to claim 4, wherein the virtual object has the role of a sound emission object that emits sound in the virtual reality space, and, the output control of the sound includes determining whether the positional condition is satisfied with an ear of the user as the real target object so that sound is output from the headphone as if the sound emission object in the virtual reality space has become close to the ear of the user.

7. The control method according to claim 5, wherein the virtual object has the role of a sound emission object that emits sound in the virtual reality space, and, the output control of the sound includes determining whether the positional condition is satisfied with an ear of the user as the real target object so that sound is output from the headphone as if the sound emission object in the virtual reality space has become close to the ear of the user.

8. The control method according to claim 6, wherein the virtual object has the role of a sound output device with a telephone function, and the output control of the sound is performed such that communication sound is output as the sound according to the role by the telephone function.

9. The control method according to claim 7, wherein the virtual object has the role of a sound output device with a telephone function, and the output control of the sound is performed such that communication sound is output as the sound according to the role by the telephone function.

10. A control method comprising:
    tracking a position of a reference body in a real space, the reference body being a first body part of a user or a controller;
    displaying an image of a virtual reality space associated with the real space on a head tracking-type head mounted display (HMD) worn by the user;
    associating a position of a virtual object given a role in the virtual reality space with the position of the reference body to follow the position of the reference body;
    performing a control to output sound according to the role from a headphone worn by the user based on whether a positional condition for changing sound determined based on the position of the reference body in the real space or the position of the virtual object in the virtual reality space is satisfied, wherein:
    the output control of the sound includes determining whether the positional condition is satisfied, the positional condition being a distance condition that a given real target object in the real space and the reference body has become close to each other,
    the virtual object has the role of a sound emission object that emits sound in the virtual reality space,
    the output control of the sound includes determining whether the positional condition is satisfied with an ear of the user as the real target object so that sound is output from the headphone as if the sound emission object in the virtual reality space has become close to the ear of the user,
    the virtual object has the role of a sound output device with a telephone function,
    the output control of the sound is performed such that communication sound is output as the sound according to the role by the telephone function, and
    the output control of the sound is performed such that:
    when the positional condition is not satisfied, the communication sound by the telephone function is not output and instead a ringtone by the telephone function is output, and when the positional condition is satisfied, the ringtone by the telephone function is not output and instead the communication sound by the telephone function is output.

11. A control method comprising:
tracking a position of a reference body in a real space, the reference body being a first body part of a user or a controller;
displaying an image of a virtual reality space associated with the real space on a head tracking-type head mounted display (HMD) worn by the user;
associating a position of a virtual object given a role in the virtual reality space with the position of the reference body to follow the position of the reference body;
performing a control to output sound according to the role from a headphone worn by the user based on whether a positional condition for changing sound determined based on the position of the reference body in the real space or the position of the virtual object in the virtual reality space is satisfied, wherein:
the output control of the sound includes determining whether the positional condition is satisfied, the positional condition being a distance condition that a virtual target object in the virtual reality space corresponding to the real target object and the virtual object has become close to each other,
the virtual object has the role of a sound emission object that emits sound in the virtual reality space,
the output control of the sound includes determining whether the positional condition is satisfied with an ear of the user as the real target object so that sound is output from the headphone as if the sound emission object in the virtual reality space has become close to the ear of the user,
the virtual object has the role of a sound output device with a telephone function,
the output control of the sound is performed such that communication sound is output as the sound according to the role by the telephone function, and
the output control of the sound is performed such that:
when the positional condition is not satisfied, the communication sound by the telephone function is not output and instead a ringtone by the telephone function is output, and
when the positional condition is satisfied, the ringtone by the telephone function is not output and instead the communication sound by the telephone function is output.

12. A control method comprising:
tracking a position of a reference body in a real space, the reference body being a first body part of a user or a controller;
displaying an image of a virtual reality space associated with the real space on a head tracking-type head mounted display (HMD) worn by the user;
associating a position of a virtual object given a role in the virtual reality space with the position of the reference body to follow the position of the reference body;
performing a control to output sound according to the role from a headphone worn by the user based on whether a positional condition for changing sound determined based on the position of the reference body in the real space or the position of the virtual object in the virtual reality space is satisfied, wherein:
the output control of the sound includes determining whether the positional condition is satisfied, the positional condition being a distance condition that a given real target object in the real space and the reference body has become close to each other,
the virtual object has the role of a sound emission object that emits sound in the virtual reality space,
the output control of the sound includes determining whether the positional condition is satisfied with an ear of the user as the real target object so that sound is output from the headphone as if the sound emission object in the virtual reality space has become close to the ear of the user,
the virtual object has the role of a sound output device with a telephone function,
the output control of the sound is performed such that communication sound is output as the sound according to the role by the telephone function, and
the output control of the sound is performed such that:
when the positional condition is not satisfied, the environmental sound in the virtual reality space is output, and
when the positional condition is satisfied, the environmental sound in the virtual reality space is lowered in volume and attenuated in a high-tone range.

13. A control method comprising:
tracking a position of a reference body in a real space, the reference body being a first body part of a user or a controller;
displaying an image of a virtual reality space associated with the real space on a head tracking-type head mounted display (HMD) worn by the user;
associating a position of a virtual object given a role in the virtual reality space with the position of the reference body to follow the position of the reference body;
performing a control to output sound according to the role from a headphone worn by the user based on whether a positional condition for changing sound determined based on the position of the reference body in the real space or the position of the virtual object in the virtual reality space is satisfied, wherein:
the output control of the sound includes determining whether the positional condition is satisfied, the positional condition being a distance condition that a virtual target object in the virtual reality space corresponding to the real target object and the virtual object has become close to each other,
the virtual object has the role of a sound emission object that emits sound in the virtual reality space,
the output control of the sound includes determining whether the positional condition is satisfied with an ear of the user as the real target object so that sound is output from the headphone as if the sound emission object in the virtual reality space has become close to the ear of the user,
the virtual object has the role of a sound output device with a telephone function,
the output control of the sound is performed such that communication sound is output as the sound according to the role by the telephone function, and
the output control of the sound is performed such that:
when the positional condition is not satisfied, the environmental sound in the virtual reality space is output, and
when the positional condition is satisfied, the environmental sound in the virtual reality space is lowered in volume and attenuated in a high-tone range.

14. The control method according to claim 8, wherein the output control of the sound is performed such that, when the positional condition is satisfied, given echoing sound is further output.

15. The control method according to claim 9, wherein the output control of the sound is performed such that, when the positional condition is satisfied, given echoing sound is further output.

16. The control method according to claim 8, wherein the output control of the sound is performed such that, when the positional condition is satisfied, given noise is further output.

17. The control method according to claim 9, wherein the output control of the sound is performed such that, when the positional condition is satisfied, given noise is further output.

18. A control method comprising:
tracking a position of a reference body in a real space, the reference body being a first body part of a user or a controller;
displaying an image of a virtual reality space associated with the real space on a head tracking-type head mounted display (HMD) worn by the user;
associating a position of a virtual object given a role in the virtual reality space with the position of the reference body to follow the position of the reference body;
performing a control to output sound according to the role from a headphone worn by the user based on whether a positional condition for changing sound determined based on the position of the reference body in the real space or the position of the virtual object in the virtual reality space is satisfied, wherein:
the output control of the sound includes determining whether the positional condition is satisfied, the positional condition being a distance condition that a given real target object in the real space and the reference body has become close to each other,
the virtual object has the role of a sound emission object that emits sound in the virtual reality space,
the output control of the sound includes determining whether the positional condition is satisfied with an ear of the user as the real target object so that sound is output from the headphone as if the sound emission object in the virtual reality space has become close to the ear of the user, and
the output control of the sound includes: (A) determining whether each of the user's right and left ears satisfies the positional condition, and (B) only when either of the ears satisfies the positional condition, outputting sound from a right or left output of the headphone corresponding to the ear satisfying the positional condition as if the sound emission object in the virtual reality space has become close to the ear.

19. A control method comprising:
tracking a position of a reference body in a real space, the reference body being a first body part of a user or a controller;
displaying an image of a virtual reality space associated with the real space on a head tracking-type head mounted display (HMD) worn by the user;
associating a position of a virtual object given a role in the virtual reality space with the position of the reference body to follow the position of the reference body;
performing a control to output sound according to the role from a headphone worn by the user based on whether a positional condition for changing sound determined based on the position of the reference body in the real space or the position of the virtual object in the virtual reality space is satisfied, wherein:
the output control of the sound includes determining whether the positional condition is satisfied, the positional condition being a distance condition that a virtual target object in the virtual reality space corresponding to the real target object and the virtual object has become close to each other,
the virtual object has the role of a sound emission object that emits sound in the virtual reality space,
the output control of the sound includes determining whether the positional condition is satisfied with an ear of the user as the real target object so that sound is output from the headphone as if the sound emission object in the virtual reality space has become close to the ear of the user, and
the output control of the sound includes: (A) determining whether each of the user's right and left ears satisfies the positional condition, and (B) only when either of the ears satisfies the positional condition, outputting sound from a right or left output of the headphone corresponding to the ear satisfying the positional condition as if the sound emission object in the virtual reality space has become close to the ear.

20. The control method according to claim 18, wherein the output control of the sound includes determining whether each of the user's right and left ears satisfies the positional condition, and
when either of the ears satisfies the positional condition, the sound from the right or left output of the headphone corresponding to the ear not satisfying the positional condition is reduced.

21. The control method according to claim 19, wherein the output control of the sound includes determining whether each of the user's right and left ears satisfies the positional condition, and
when either of the ears satisfies the positional condition, the sound from the right or left output of the headphone corresponding to the ear not satisfying the positional condition is reduced.

22. The control method according to claim 4, wherein the virtual object has the role of a sound input device that inputs sound in the virtual reality space, and
the output control of the sound includes determining whether the real target object as a second body part of the user satisfies the positional condition so that emitted sound is output from the headphone as if the sound input device in the virtual reality space inputs the emitted sound from the second body part of the user.

23. The control method according to claim 5, wherein the virtual object has the role of a sound input device that inputs sound in the virtual reality space, and
the output control of the sound includes determining whether the real target object as a second body part of the user satisfies the positional condition so that emitted sound is output from the headphone as if the sound input device in the virtual reality space inputs the emitted sound from the second body part of the user.

24. The control method according to claim 1, wherein the output control of the sound is performed to change the sound in the case where the positional condition is satisfied depending on whether an event clear condition that a given event has occurred, has been executed, or has been attained is satisfied.

25. The control method according to claim 1, further comprising:

arranging and controlling a virtual reference body following the position of the reference body in the virtual reality space;

initially arranging the virtual object in the virtual reality space;

instructing the user to put the virtual reference body closer to the position of the initial arrangement; and after the instruction, setting an association between the virtual object and the reference body when the position of the virtual reference body and the position of the initial arrangement satisfy a predetermined condition, wherein causing the virtual object to follow the reference body includes, after setting the association between the virtual object and the reference body, associating the position of the virtual object with the position of the reference body to follow the position of the reference body.

26. A virtual reality experience provision apparatus for use with a user, the virtual reality experience provision apparatus comprising:

at least one processor and/or a circuit configured to:

track a position of a reference body in a real space via a sensor, the reference body being a first body part of the user or a controller;

display an image of a virtual reality space associated with the real space on a head tracking-type head mounted display (HMD) worn by the user;

associate a position of a virtual object given a role in the virtual reality space with the position of the reference body to follow the position of the reference body; and output sound according to the role from a headphone worn by the user based on whether a positional condition for changing sound determined based on the position of the reference body in the real space or the position of the virtual object in the virtual reality space is satisfied, wherein:

when the positional condition is not satisfied: (a) the sound according to the role is not output and instead environmental sound in the virtual reality space is output, or (b) the environmental sound in the virtual reality space is output louder than the sound according to the role, and when the positional condition is satisfied: (i) the environmental sound in the virtual reality space is not output and instead the sound according to the role is output, or (ii) the sound according to the role is output louder than the environmental sound in the virtual reality space.

* * * * *